US010629860B2

(12) United States Patent
Schröder et al.

(10) Patent No.: US 10,629,860 B2
(45) Date of Patent: Apr. 21, 2020

(54) BATTERY MODULE WITH BATTERY MODULE HOUSING AND BATTERY CELLS

(71) Applicant: Innolith Assets AG, Basel (CH)

(72) Inventors: Joachim Schröder, Köln (DE); Markus Borck, Stuttgart (DE)

(73) Assignee: INNOLITH ASSETS AG, Basel (CH)

( * ) Notice: Subject to any disclaimer, the term of this patent is extended or adjusted under 35 U.S.C. 154(b) by 90 days.

(21) Appl. No.: 15/792,145

(22) Filed: Oct. 24, 2017

(65) Prior Publication Data

US 2018/0205045 A1 Jul. 19, 2018

Related U.S. Application Data

(63) Continuation of application No. 13/718,799, filed on Dec. 18, 2012, now abandoned.

(Continued)

(30) Foreign Application Priority Data

Dec. 21, 2011 (EP) ..................................... 11194916

(51) Int. Cl.
*H01M 2/02* (2006.01)
*H01M 10/625* (2014.01)
(Continued)

(52) U.S. Cl.
CPC ........... *H01M 2/0257* (2013.01); *B60L 50/50* (2019.02); *H01M 2/1077* (2013.01);
(Continued)

(58) Field of Classification Search
None
See application file for complete search history.

(56) References Cited

U.S. PATENT DOCUMENTS 3,647,556 A 3/1972 Cox
4,020,244 A 4/1977 Selinko
(Continued)

FOREIGN PATENT DOCUMENTS

DE 10 2010 021 922 A1 12/2011
EP 2 367 220 A1 9/2011
(Continued)

OTHER PUBLICATIONS

Lenntech, Polypropylene, 2005, 3 pages.

*Primary Examiner* — Ula C Ruddock
*Assistant Examiner* — Anna Korovina
(74) *Attorney, Agent, or Firm* — Bose McKinney & Evans LLP

(57) ABSTRACT

A battery module comprises a battery module housing with parts made of plastic and a plurality of prismatic battery cells that have a cell housing with four side walls. Two parallel side walls are larger than the two other side walls. The electrolyte of the battery cells is preferably $SO_2$-based. The battery module housing (2) has a cooling system with a channel structure (32) and a fluid coolant. The channel structure (32) has a fluid connection with a coolant inlet (11) and a coolant outlet (12) of the battery module housing (2). An intermediate wall (13) made of plastic is located between two adjacent battery cells (5) essentially parallel to the larger side walls (7) of the battery cell (5). One channel (31) of the channel structure (32) runs at least partially in the intermediate wall (13) and is formed by means of a recess (33) in the intermediate wall (13) that is open at least to one adjacent side wall (7) of the battery cell (5). A plastic separating layer (38), whose material is preferably different to the material of the intermediate wall (13) and whose thickness is less than the thickness of the intermediate wall (13), is arranged between the side wall (7) of the battery cell (5) and the intermediate wall (13) in such a manner that the (Continued)

channel (31) of the cooling system formed by the recess (33) is closed by the plastic separating layer (38).

20 Claims, 30 Drawing Sheets

Related U.S. Application Data

(60) Provisional application No. 61/584,383, filed on Jan. 9, 2012, provisional application No. 61/584,394, filed on Jan. 9, 2012.

(51) Int. Cl.
*H01M 10/647* (2014.01)
*H01M 10/6557* (2014.01)
*H01M 10/6567* (2014.01)
*H01M 10/613* (2014.01)
*H01M 2/10* (2006.01)
*B60L 50/50* (2019.01)
*H01M 10/653* (2014.01)
*H01M 10/0563* (2010.01)

(52) U.S. Cl.
CPC ....... *H01M 10/613* (2015.04); *H01M 10/625* (2015.04); *H01M 10/647* (2015.04); *H01M 10/6557* (2015.04); *H01M 10/6567* (2015.04); *H01M 10/0563* (2013.01); *H01M 10/653* (2015.04)

(56) References Cited

U.S. PATENT DOCUMENTS

| | | | |
|---|---|---|---|
| 4,744,414 A * | 5/1988 | Schon | F28F 3/083 165/167 |
| 5,643,691 A | 7/1997 | Iwatsuki et al. | |
| 6,296,968 B1 | 10/2001 | Verhoog | |
| 6,672,292 B2 | 1/2004 | Fischer | |
| 6,730,441 B1 | 5/2004 | Hambitzer et al. | |
| 7,504,175 B2 | 3/2009 | Mühe | |
| 7,981,538 B2 | 7/2011 | Kim et al. | |
| 2003/0008205 A1 | 1/2003 | Horie et al. | |
| 2003/0017384 A1 | 1/2003 | Marukawa et al. | |
| 2005/0287426 A1 | 12/2005 | Kim et al. | |
| 2008/0160395 A1 | 7/2008 | Okada | |
| 2008/0280194 A1 | 11/2008 | Okada | |
| 2009/0258289 A1 | 10/2009 | Weber et al. | |
| 2010/0099023 A1 | 4/2010 | Kuroda et al. | |
| 2010/0167115 A1 | 7/2010 | Okada et al. | |
| 2010/0247990 A1 | 9/2010 | Ugaji et al. | |
| 2011/0052960 A1 | 3/2011 | Kwon et al. | |
| 2011/0104548 A1 * | 5/2011 | Saito | H01M 2/1072 429/120 |
| 2011/0206964 A1 * | 8/2011 | Odumodu | H01M 10/6557 429/120 |
| 2011/0212355 A1 | 9/2011 | Essinger et al. | |
| 2011/0287304 A1 | 11/2011 | Zinck et al. | |
| 2011/0293982 A1 | 12/2011 | Martz et al. | |
| 2011/0305935 A1 * | 12/2011 | Yoon | H01M 2/1061 429/120 |
| 2012/0219838 A1 | 8/2012 | Terada et al. | |
| 2012/0313560 A1 | 12/2012 | Hambitzer et al. | |
| 2013/0071720 A1 * | 3/2013 | Zahn | H01M 2/1077 429/120 |

FOREIGN PATENT DOCUMENTS

| | | | |
|---|---|---|---|
| EP | 2 380 223 | 10/2011 | |
| WO | WO 2008/050211 A1 | 5/2008 | |
| WO | WO 2010/002138 A2 | 1/2010 | |
| WO | WO 2010/069713 A1 | 6/2010 | |
| WO | WO 2011/048916 A1 | 4/2011 | |
| WO | WO 2011/095630 A1 | 8/2011 | |
| WO | WO 2011/098233 A2 | 8/2011 | |
| WO | WO-2011147550 A1 * | 12/2011 | ......... H01M 2/1077 |
| WO | WO 2013/037742 A1 | 3/2013 | |

* cited by examiner

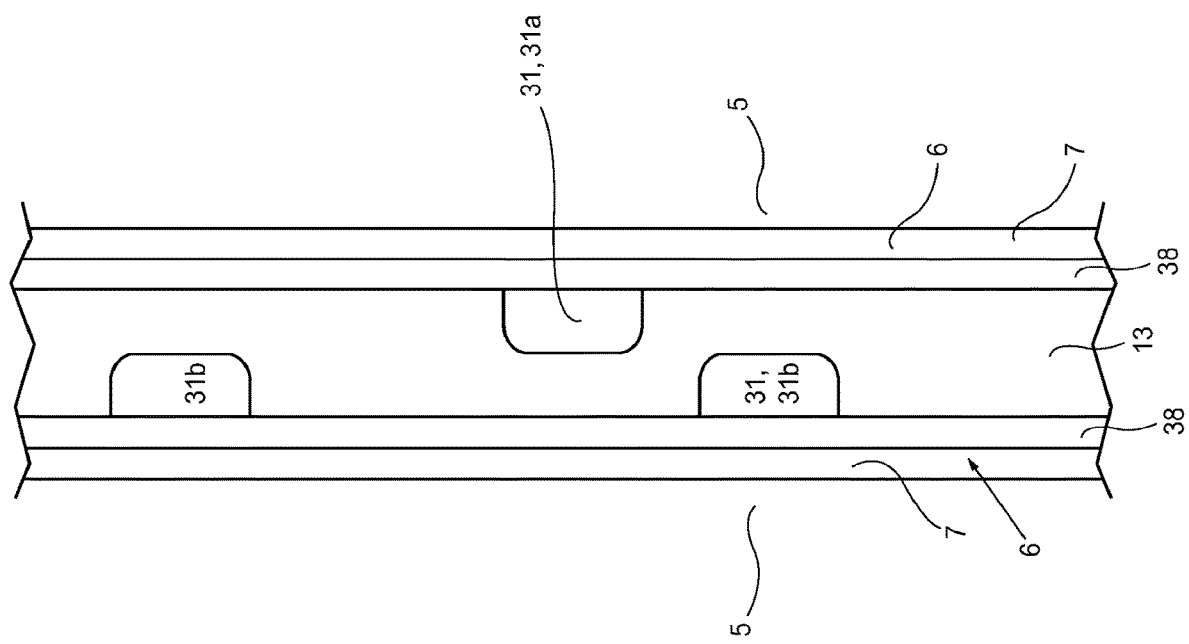

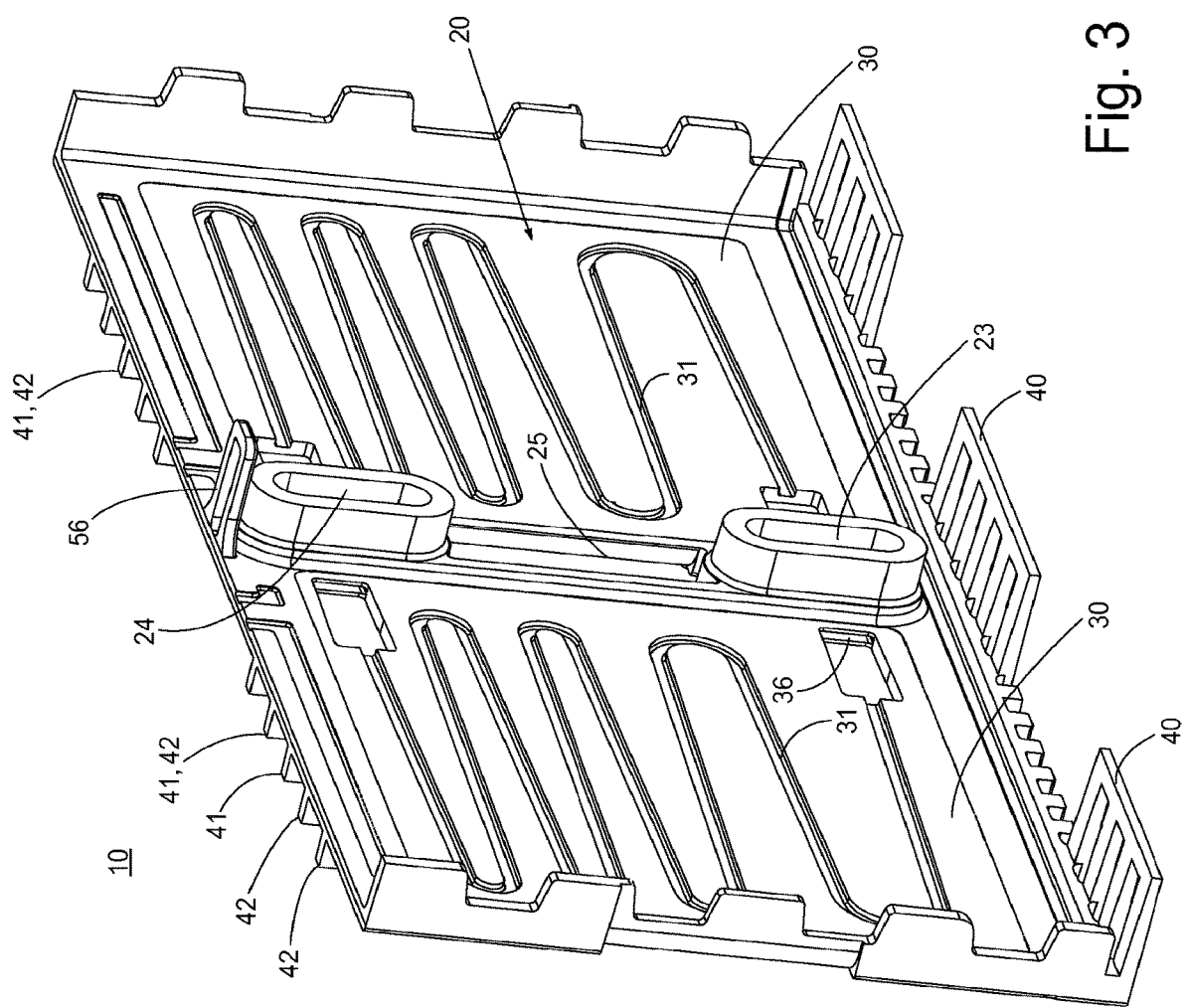

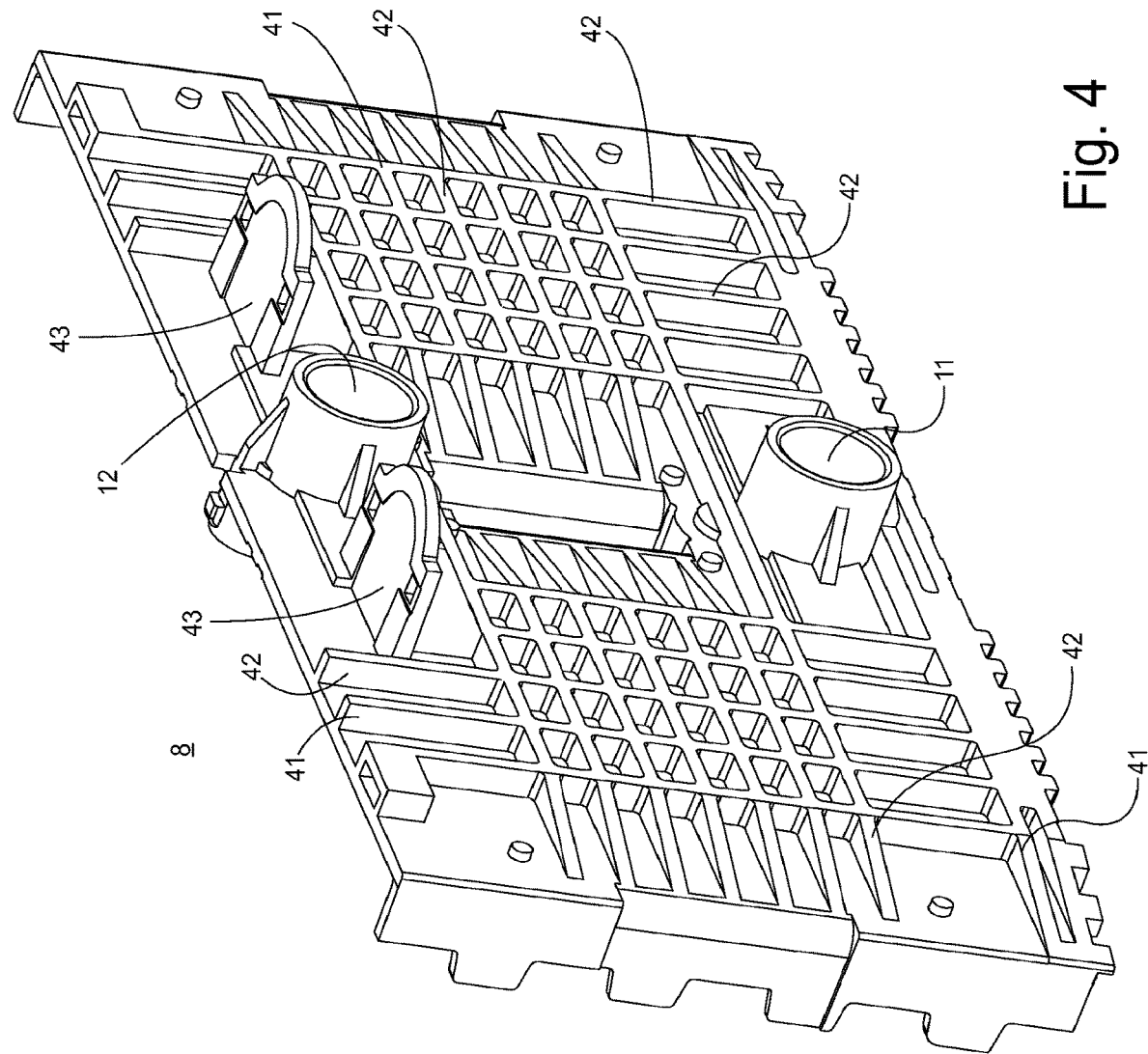

BATTERY MODULE WITH BATTERY MODULE HOUSING AND BATTERY CELLS

This application is a continuation of U.S. patent application Ser. No. 13/718,799, filed Dec. 18, 2012, which claims priority to U.S. Provisional Application No. 61/584,383, filed Jan. 9, 2012, and U.S. Provisional Application No. 61/584,394, filed Jan. 9, 2012, and EP 11 194 916.0, filed Dec. 21, 2011, each of which are incorporated herein by reference in their entireties.

The present invention concerns a battery module comprising a battery module housing with parts made of plastic and a plurality of prismatic battery cells that have a cell housing with four side walls.

Rechargeable battery cells are of great importance in many technical fields. They are frequently used for applications in which only low currents are needed, such as in cell phones. There is also a large requirement for battery cells for high-current applications, particularly for electrical drives for motor vehicles. In the automotive field in particular, many battery modules are used that comprise a plurality of prismatic battery cells, since these battery cells permit realization of a compact battery module design and make best possible use of the space available in motor vehicles.

A battery module comprises a plurality of battery cells that supply a characteristic voltage for the cell. The voltage depends on the material combination used. One or a plurality of battery modules that are electrically connected form a battery. In order to meet the requirements relating to the power and energy quantities of a battery, battery modules are made up of a plurality of battery cells that are electrically connected in series and/or parallel.

Heat is produced during operation of a battery, the heat quantity being dependent among other things on the electrolyte solution used in the battery cell. Rechargeable batteries are known in the state of the art that have a cooling device for battery cooling. For example, battery cells are described in US 2003/0017384 A1 where a metal plate is integrated in the side wall of the housing that is adjacent to a plate-type heat transfer part. EP 2 380 223 A1 describes heat transfer elements and heat transfer plates in a housing for a battery with battery cells, whereby heat dissipation from the battery cells takes place via the heat transfer devices. In addition to cooling of the battery cells by means of cooling plates, liquid cooling or air cooling are also known in the state of the art, for example, as described in U.S. Pat. Nos. 7,981,538 and 6,296,968 for the example of a nickel-cadmium battery or a nickel metal-hydride battery.

Also known in the state of the art are cooling plates between battery cells that feature meander-type cooling channels. Here, the cooling channels are formed by a punched or otherwise shaped first plate, the open side of the channels being closed off by a second plate. Both plates have the same thickness. Metal or polymers are suggested as suitable materials. Such an embodiment is described, for example, in US 2009/0258289 A1.

WO 2008/050211 uses spacing plates to cool individual battery cells, these being formed so that air can flow through between two adjacent battery cells for cooling. US 2003/0008205 A1 describes a cooling structure that has a plurality of triangularly shaped wall sections between two adjacent battery cells, said wall sections forming a zigzag-type internal structure between two essentially parallel walls. Air can flow for cooling purposes through the resultant air spaces. The walls used and the zigzag-type internal structure each comprise plates of equal thickness.

In practice, rechargeable lithium battery cells are almost exclusively lithium-ion cells. The negative electrode is generally made of graphite that is coated on a copper collector material. The positive electrode is generally based on lithium cobalt oxide that has an aluminum current collector. Transport of the ions in the cell is performed by the electrolyte solution, which guarantees the ion mobility. The electrolyte solution generally consists of a lithium salt that is dissolved in an organic solvent or solvent mixture. Such organic lithium-ion cells are critical with respect to their safety, since the organic solvent of the electrolyte solution is combustible and has a low flash point, so that it is necessary to avoid an increase in temperature inside the cell. This applies in particular to batteries for high-current applications. In order to avoid such risks, measures are implemented for lithium-ion cells with respect to exact control of the charging and discharging processes and with respect to the battery construction. Cooling of the battery frequently also takes place.

In spite of the efforts in the state of the art to optimize rechargeable battery modules for high-current applications and to meet the partly contradictory requirements, the need for an improved battery module remains that satisfies the following requirements in particular:
  very good electrical power data, in particular high energy density with high extractable currents
  improved safety, also under the special conditions prevailing in a motor vehicle
  low weight in order to achieve a high power density per unit weight (kilogram)
  compact design in order to provide the largest possible amount of electrical energy per unit volume
  high mechanical stability of the battery module housing
  low price due to inexpensive materials and the simplest possible production processes The problems known in the state of the art are solved according to the invention by means of a battery module with the features of claim 1. It was recognized here that in addition to cooling, a decisive part is also played by the housing and its stability.

According to the invention, the battery module comprises a battery module housing with parts made of plastic and a plurality of prismatic battery cells. The battery cells have a cell housing with four preferably metal side walls, of which two parallel side walls are larger than the other two side walls. The cell housing of the battery cell prevents the electrolyte or solvent contained therein from escaping from the cell in liquid or gaseous form. In contrast, it is possible to dispense with a cell housing for cells with a solid electrolyte. The battery cells contain an electrolyte solution, which is preferably based on $SO_2$. Such battery cells with an $SO_2$-based electrolyte are described in WO 2011/098233, for example. At least the positive electrode preferably contains an active material in a composition including lithium.

The battery module housing has a cooling system with a channel structure and a fluid coolant. The coolant can therefore be both a gas as well as a cooling liquid. Hereafter, the term coolant will be used without limiting the generality of the cooling fluid. The battery module housing has at least one coolant inlet and at least one coolant outlet, which possess a fluid connection with the channel structure of the cooling system. The battery module housing preferably has exactly one coolant inlet and exactly one coolant outlet. The channel structure preferably starts at the coolant inlet and ends at the coolant outlet of the housing.

The battery module is constructed such that an intermediate wall made of plastic is positioned between two adjacent battery cells, said intermediate wall being essentially arranged parallel to the two larger side walls of the battery cells. One channel of the channel structure runs at least partially in the intermediate wall and is formed by means of a recess in the intermediate wall. The recess in the intermediate wall is open at least towards one adjacent side wall of the battery cells. The recess in the intermediate wall is produced by removing material from the original intermediate wall. A channel that is open on one side or on both sides is produced as a result. The thickness of the intermediate wall is reduced in the area of the recess in comparison with the areas that do not comprise part of the recess. No material is present in the case of a recess that is open on both sides. The term recess in the channel structure shall be understood in this sense.

A plastic separating layer is located between the side wall of the battery cell and the intermediate wall. Its material is preferably different to the material of the intermediate wall. The thickness of the plastic separating layer is less than the thickness of the intermediate wall. The plastic separating layer is arranged so that the channel of the cooling system formed by the recess in the intermediate wall is closed by the plastic separating layer. This prevents coolant flowing in the channel of the channel structure from escaping from the channel and coming into direct contact with the side wall of the battery cell, which is preferably made of metal. This ensures that the metal side wall of the battery cell is not damaged by the coolant. The coolant can be chosen independently of its reaction characteristics with metals.

In a preferred embodiment, the intermediate wall comprises elements or means to fix and hold the adjacent battery cell in its position. For example, these elements may be holders that establish a defined relative position between intermediate wall and battery cell. In a preferred embodiment, the intermediate wall has an intermediate wall base for this purpose that extends at least partially under a battery cell arranged at the intermediate wall. The intermediate wall may also preferably additionally or alternatively have an intermediate wall top side that extends at least partially over the top side of the battery cell housing of an adjacent battery cell. Also preferably, an intermediate wall side wall of the intermediate wall can be additionally or optionally used to position the battery cell. Furthermore, a side wall of the center part of the intermediate wall or a side wall of the distribution area of the intermediate wall can serve as a positioning aid or holder for a battery cell.

The distribution channel and the collection channel as well as a through-recess for a clamping device are routed in the distribution area. The wall designated as the distribution area side wall can fix and hold the battery cell in its horizontal position together with the intermediate wall side wall. The intermediate wall top side can fix and hold the battery wall in its vertical position together with the intermediate wall base. The top side of the intermediate wall preferably has a recess so that the electrical connections of the battery cell are accessible. Only parts of the walls, top side or base can of course also serve as holding elements.

The intermediate wall side wall, the distribution area side wall, the intermediate wall base and the intermediate wall top side preferably jointly form a frame-type holding structure that is adapted to the battery cells. In a preferred embodiment, this frame-type holding structure is located both on the front side and also on the rear side of the intermediate wall. If a battery cell is positioned between two intermediate walls, it is preferably enclosed completely by the intermediate walls and the provided holding structures. This does not just permit reliable and defined holding of the battery cell, but also insulates the battery cell housing towards the environment. The battery cell housing made of metal therefore does not have any contact with the environment of the battery housing.

The intermediate wall therefore simultaneously performs several tasks, namely insulation of the battery cell towards the environment and holding the battery cell in a defined position. In addition, a plurality of intermediate walls jointly form part of the battery housing. In particular, at least parts of the battery housing side wall are formed by the intermediate wall side walls. Furthermore, efficient cooling of the battery cells is guaranteed.

Arrangement of parts of the cooling system in the intermediate walls has the advantage that the coolant is brought very close to the battery cells. Large-area cooling is possible here, so that the temperature of the battery cells can be reduced very effectively and efficiently. The thickness of the plastic separating layer between the side wall of the battery cell and the intermediate wall is preferably significantly less than the thickness of the intermediate wall in order to guarantee the best possible heat transfer from the battery cell side wall with good thermal conductivity to the fluid coolant.

The vapor pressure of electrolyte solutions based on $SO_2$ depends on the amount of $SO_2$ contained in the electrolyte solution and on the temperature. In the case of battery cells containing such an electrolyte solution, the problem arises that the pressure in the battery cell increases as a result of an increase in temperature, leading to expansion of the battery cell housing. For this reason, particularly effective cooling of such battery cells is especially necessary.

The expansion or increase in thickness (swelling) of the electrodes during operation is also a problem of battery cells, such as organic lithium polymer cells, for example. This phenomenon can also be observed for battery cells with an $SO_2$-based electrolyte solution. In addition to cooling, the battery construction should also counteract this behavior by absorbing the internal pressure. This can be achieved, for example, by means of a clamping device, a tension band, reinforced side walls or housing walls, such as a reinforced end wall, or by means of pressure-stable intermediate walls.

The thickness of the plastic separating layer should be significantly less than the thickness of the intermediate wall in order to ensure the best possible heat transfer. The thickness of the plastic separating layer is preferably no more than 20% of the thickness of the intermediate wall. The inventors have found that a thickness of the plastic separating layer of no more than 10%, preferably no more than 5% and very preferably no more than 1% of the thickness of the intermediate wall results in particularly good heat transfer. Further investigations have shown that the thickness of the plastic separating layer should be preferably no more than 1 mm. A plastic separating layer with a thickness of no more than 0.5 mm, further preferably no more than 0.1 mm and very preferably no more than 0.01 mm further improves heat transfer. It has also been shown that the plastic separating layer should preferably be made of polyamide. Plastics made of polyamides (PA) are very suitable for processing to produce semi-transparent films. The material is characterized by high heat resistance as well as by electrical insulation properties. The product polyamide PA66 is preferably used.

The thickness of the intermediate wall is preferably much greater than the thickness of the plastic separating layer. The thickness of the intermediate wall is preferably no more than 20 mm, particularly preferably no more than 10 mm and further preferably no more than 7 mm. Investigations have shown that the thickness of the intermediate wall can preferably be further reduced so that it is preferably no more than 5 mm and particularly preferably no more than 4 mm. In particular, a thickness of 3 mm is preferred. A reduction in the intermediate wall thickness to less than 1 mm is not expedient. The thickness of the intermediate wall should preferably not be less than 2 mm. The thinner it is possible to realize the intermediate wall, the higher the packing density in the battery module, i.e. with thinner intermediate walls, it is possible to accommodate more battery cells in a battery module housing with the same volume. A thin intermediate wall thus leads to better utilization of the volume of the battery module housing.

However, the intermediate wall cannot be arbitrarily thin since it must withstand any forces that occur, particularly in $SO_2$-based battery cells. In addition, it must be guaranteed that sufficient coolant can be transported in order to realize the required thermal output. For this purpose, the channel with rounded or rectangular cross-section can have different cross-sections. For example, at least one liter of coolant should be able to flow per minute, a flow rate of at least 1.5 l/min is very preferred, and a flow rate of at least 1.6 l/min is further preferred. The channel structure in the intermediate wall must be designed correspondingly for this purpose. Investigations on a battery module with 12 cells arranged in two rows have shown, for example, that a flow rate of at least 2.25 l/min is particularly advantageous. In general, the inventors have found that a flow rate of at least 0.125 l/min per battery cell is advantageous and particularly preferably a flow rate of at least 0.18 l/min per battery cell.

The fluid serves to transport heat to or from the surface of the battery cells. The type of fluid (gaseous, liquid, thermal capacity), the inlet temperature and the flow rate must be adapted to the thermal balance of the battery cell. The thermal balance depends on the electrical load, the cell geometry and the thermal capacities of the cell materials used. If the electrical load is low, the cell can be cooled by means of a gaseous cooling medium, e.g. air. Cooling with a liquid cooling medium is preferred for high loads.

The intermediate wall is preferably made of plastic, particularly preferably from a dark-colored plastic such as PA6T/6I. The plastic separating layer, which is preferably made of a semi-transparent PA66 film, can then be welded onto the intermediate wall by means of a laser welding process. The plastic separating layer and the intermediate wall are joined with each other in such a way that the open sides of the recesses in the intermediate wall are closed, preferably closed liquid-tight and/or gas-tight, depending on the type of fluid.

In a preferred embodiment of the battery module according to the invention, the plastic of the intermediate wall is thermoplastic. The intermediate wall can then be produced by means of an injection molding process, so that the channels of the channel structure can be incorporated directly in the intermediate wall in practically any form.

The recess can be preferably realized with a meander-type form in the intermediate wall. The meander extends from a lower area of the intermediate wall to an upper area. In this way, a relatively large cooling area is achieved that adjoins the side wall of the battery cells and through which coolant flows. The stability of the intermediate wall is nevertheless maintained.

The meander of the channel particularly preferably has meander loops that become narrower in the flow direction of the cooling medium. The meander loops are preferably narrower in the upper area of the intermediate wall so that the area available for heat transfer increases in upward direction. As a result, it is also possible to achieve good cooling in the upper area even if the coolant has already been heated up on its path in flow direction because it has already absorbed heat from the neighboring battery cells in the lower area of the intermediate wall. Good and uniform cooling of the battery cells over their entire side area can be achieved by suitable selection of the number, length and spacing of the meander loops. The meanders may also have a uniform design, so that the meander loops are identical or are equally spaced with respect to each other.

In a preferred embodiment, there is a recess in the channel structure in the intermediate wall that extends over the entire thickness of the intermediate wall. The recess forms a channel that is open on both sides and is open to the two adjacent side walls of the battery cells. This results in efficient cooling of both adjacent battery cells. In this case, the intermediate wall has a separating layer on the front side and rear side in order to close off the recess on both sides so that no coolant can escape.

In an alternative very preferred embodiment, the recess of the channel structure is realized as a channel that is open on one side and open only towards one of the adjacent battery cells. The intermediate wall preferably has a second recess in the channel structure forming a further channel that is open on one side and that is open towards the opposite longitudinal side of the intermediate wall. The two channels open towards opposite sides are preferably arranged so that they are offset to each other. These channels can also both be realized with a meander-type form.

In a particular embodiment of the battery module according to the invention, the coolant inlet with a fluid connection to the channel in the intermediate wall is located below the coolant outlet. The coolant inlet is particularly preferably located in the bottom half of the battery module housing. The coolant inlet and/or coolant outlet particularly preferably has a quick-action coupling. This allows the battery module to be connected easily and without tools to an external cooling system. Such a quick-action coupling can be realized similarly to the common compressed-air connections, for example. Both the quick-action coupling and the mating piece attached to a flexible tube are preferably made of metal and can be connected to produce a sealed connection by simply plugging them into each other. Fast replacement and simple assembly of the battery module are possible in practical use. The cooling system can be easily disconnected since no special tools are required. A further possibility for a quick-action coupling is a KV2 one-touch fitting from SMC Corporation of America or an embodiment similar to a bayonet lock. The quick-action coupling can always be operated without tools and does not require screw fastening over several thread turns.

In a preferred embodiment, the plastic of the battery module housing parts is fiber-reinforced, particularly preferably glass-fiber-reinforced. A glass-fiber-reinforced polyamide has proven itself to be particularly preferable. A preferred material is the polyamide PA 6T/6I, for example. Such materials meet the requirement for a light, non-conducting, stable housing material very well. They have a low weight combined with very high stability. The mechanical properties are improved further by the glass-fiber-reinforced plastics so that in particular the so-called impact strength is significantly improved, leading to increased safety when used in motor vehicles. In the event of a collision or accident, e.g. in a frontal crash, this battery is mostly not damaged and in particular the battery cells enclosed in the battery module housing generally remain undamaged.

In addition, the glass-fiber-reinforced polyamide has the advantage that it does not just offer protection against external forces but also against the internal pressures that occur in battery cells, particularly those based on $SO_2$. Since such battery cells heat up and expand during the charging and discharging process, a glass-fiber-reinforced battery module housing simultaneously also offers mechanical stability against these pressures so that the housing can at least partially absorb the corresponding forces.

The rigidity and stability of the battery module housing is preferably also increased by providing the end walls of the battery module housing with a rib-like structure. The front wall and rear wall, which are essentially arranged parallel to the larger side walls of the battery cells, preferably have transverse and/or longitudinal struts. They can be horizontal and vertical ribs on the outer side of the walls, for example, and form a net-type reinforcing structure.

In a preferred embodiment, the end walls of the battery module housing comprise two parts. One end wall then comprises a closing wall that is adjacent to the outer battery cell of the housing and an outer wall that forms the front wall or rear wall of the battery housing. The closing wall preferably has a recess that is open on one side and that is sealed on the side facing the battery cell by a plastic separating layer. On the side facing away from the battery cell, the closing wall is preferably formed as an essentially plane surface. It may have recesses, seats, projections or similar structural elements in order to secure its relative position with respect to the outer wall. The outer wall then features corresponding elements on its inner side so that it can engage with the positioning elements of the closing wall. The closing wall and/or the end wall may also each have holding elements for positioning and holding a battery cell. Like the intermediate walls, these holding elements may be formed, for example, at least by parts of the respective side walls, base, top side and/or a distribution area side wall and/or the respective structural elements (side wall, base, etc.).

The inner side of the outer wall also has an essentially plane surface, except for the corresponding positioning elements, which are optional. Furthermore, also like the closing wall, it can of course have a through-recess, a distribution channel and/or a collection channel. Reinforcing elements may be located on the outer side of the outer wall, which may be realized by struts or similar elements. In the two-part embodiment of the end wall, the outer wall is preferably made of plastic or metal, particularly preferably of aluminum. Other metal types are possible, for example cast aluminum or similar. This increases the rigidity of the outer wall. The outer wall can optionally have recesses on its outer side, for example blind holes or slot-type blind recesses. This does not impair stability, but allows weight to be saved.

The coolant inlet and the coolant outlet are preferably located in the outer wall or end wall of the battery housing. These can accommodate a quick-action coupling or other couplings for connection of a coolant system and to provide a sealing closure of the coolant circuit. The connections for the coolant inlet and the coolant outlet are preferably located both on the front as well as the rear outer wall or end wall. In this way, it is possible to establish a fluid connection between several battery housings and extend the cooling system to a plurality of batteries. If the battery is used as a single battery (stand-alone variant), one coolant inlet and one coolant outlet is sealed by a closure in this case. This may be a plug or similar, for example. The coolant inlet and coolant outlet are preferably located on opposite walls of the battery. In this case, either the coolant inlet or the coolant outlet is sealed with a closure on each outer wall or end wall of the battery housing. The corresponding other side has the closure at the respective other inlet or outlet.

In order to further improve absorption of the exerted forces, a plurality of battery cells and the intermediate walls located between them are encompassed by a clamping device in a preferred embodiment of the battery module according to the invention. The clamping device is preferably made of metal. The clamping device assists the glass-fiber-reinforced housing in order to prevent expansion of the battery cells and thus of the entire battery module.

The clamping device particularly preferably comprises a tension band, particularly a metal tension band. This is easy to assemble and easy to handle and also has a relatively low weight. In addition, a tension band is flexible and can be adapted to different housing forms, this being advantageous particularly for a modular design of the battery module. The tension band is particularly preferably laser-welded so that the two ends close the band. The ends may overlap so that there is a sufficiently large area for welding. In a further preferred embodiment, the tension band is closed by means of a self-retaining quick-release closure. A self-locking quick-release closure has proven to be particularly preferable, so that the tension band can be tensioned easily either by hand or by using a tool, such as tensioning pliers for example.

If the battery cells are arranged in two rows (stack) in the battery module, one tension band in each case can encompass one row of the battery cells as well as the corresponding housing parts. The battery module housing preferably has a through-recess between the battery cell rows (stack) through which the tension band is routed. The tension band can also be routed twice through the through-recess, e.g. in the form of an eight. Both rows can be clamped with one band in this way. A further tension band can be clamped around the whole battery module.

The battery module has a modular design in a preferred embodiment. Since the battery module contains a plurality of interconnected battery cells depending on the required power density and voltage level, the size of the battery module housing varies depending on the number of battery cells. The intermediate walls therefore preferably have one intermediate wall side wall each on their short side ends which projects at least partially beyond the small side walls of the battery cell housing. The intermediate wall side walls preferably form a battery module housing side wall together with other intermediate walls and their intermediate wall side walls. The intermediate wall side walls particularly preferably correspond to each other so that they engage in each other and particularly preferably lock together.

In an also preferred embodiment, the intermediate wall has an intermediate wall base that projects at least partially under the battery cells and preferably forms the base of the battery module housing together with other intermediate wall bases. The intermediate wall bases preferably correspond with each other so that they engage with each other and particularly preferably lock together. In this way, it is possible to increase the size of both the base and also the side walls of the battery module housing by adding further intermediate walls.

Only one component is required, namely the intermediate wall, in order to extend both the base as well as the side wall of the battery module housing. Simple assembly is possible due to the corresponding form. At the same time, the interlocking intermediate walls hold the battery cells located between them. The stability of the battery module housing is further increased.

Such a battery module according to the invention is preferably used in a motor vehicle since it meets the requirements of the state of the art in an improved manner. On the one hand, there is optimized cooling of the battery cells in order to avoid an increase in temperature of the cells. On the other, it offers increased stability and safety. Since the cooling prevents a large increase in the battery temperature, expansion of the battery cells with an $SO_2$-based electrolyte solution is also reduced or prevented. The battery module housing is glass-fiber-reinforced in order to nevertheless absorb any forces that occur. Interlocking of the intermediate walls increases stability and makes it possible to absorb the forces that occur during operation. A clamping device, for example in the form of a tension band, may also be provided. Nevertheless, the battery module overall is not only very stable but also has a very low weight. Best possible use is made of the space in the battery module housing through use of the recesses open on one or both sides in the intermediate wall and sealing of the resultant channels by means of the thin plastic separating layer, with the result that the power density per unit volume can be significantly increased. This is achieved in combination with a simultaneous increase in the power density per unit weight.

The invention is illustrated in more detail hereafter based on particular embodiments shown in the figures. The technical features shown therein can be used individually or in combination to create preferred embodiments of the invention. The described embodiments do not represent any limitation of the invention defined in its generality by the claims.

In the figures:

FIGS. 2a-2c show an intermediate wall that is located between two adjacent battery cells;

FIG. 3 shows a rear wall of the battery module housing of the battery module from FIG. 1;

FIG. 4 shows a front wall of the battery module housing of the battery module from FIG. 1;

Figure 8A:
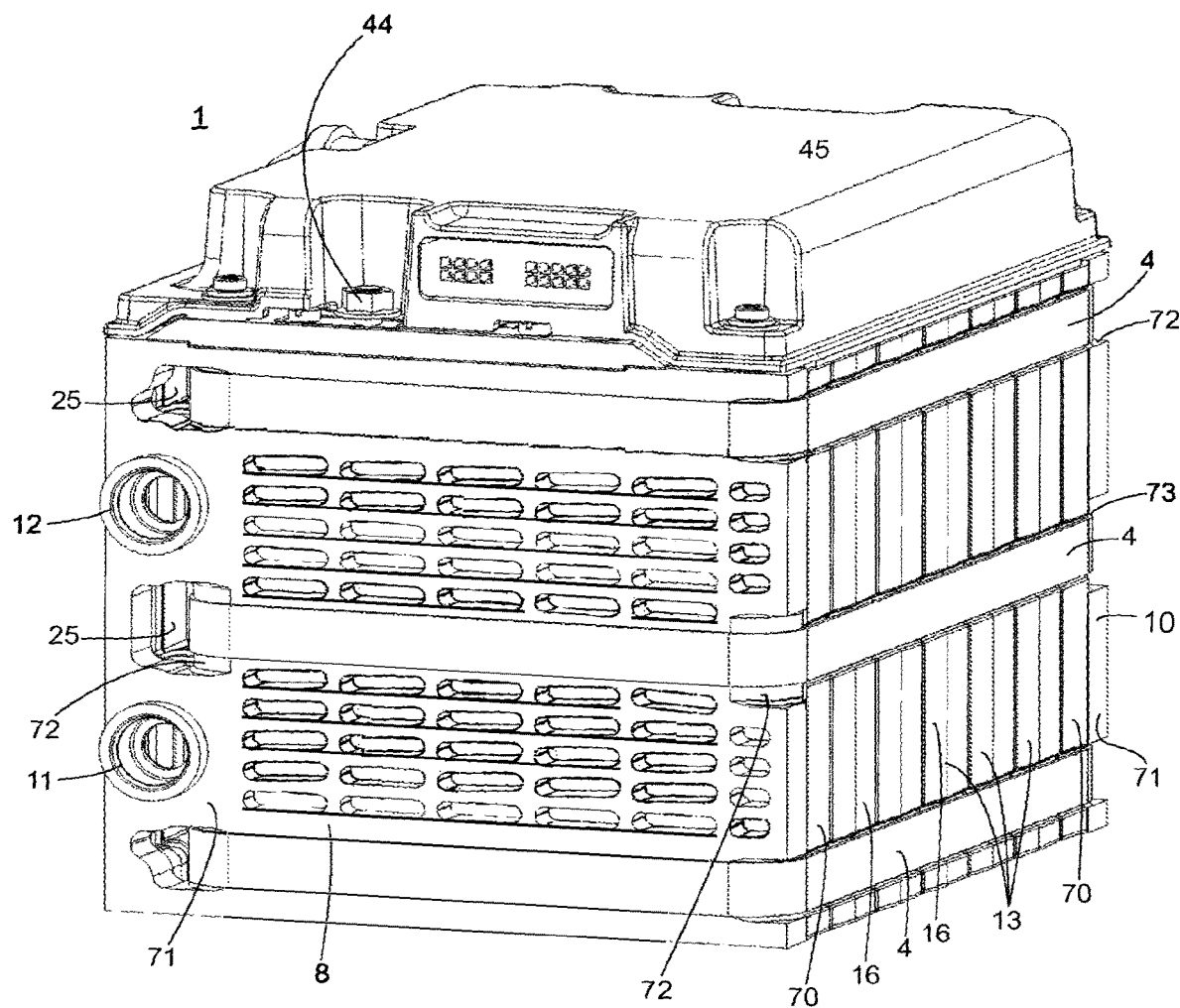
Figure 9A:
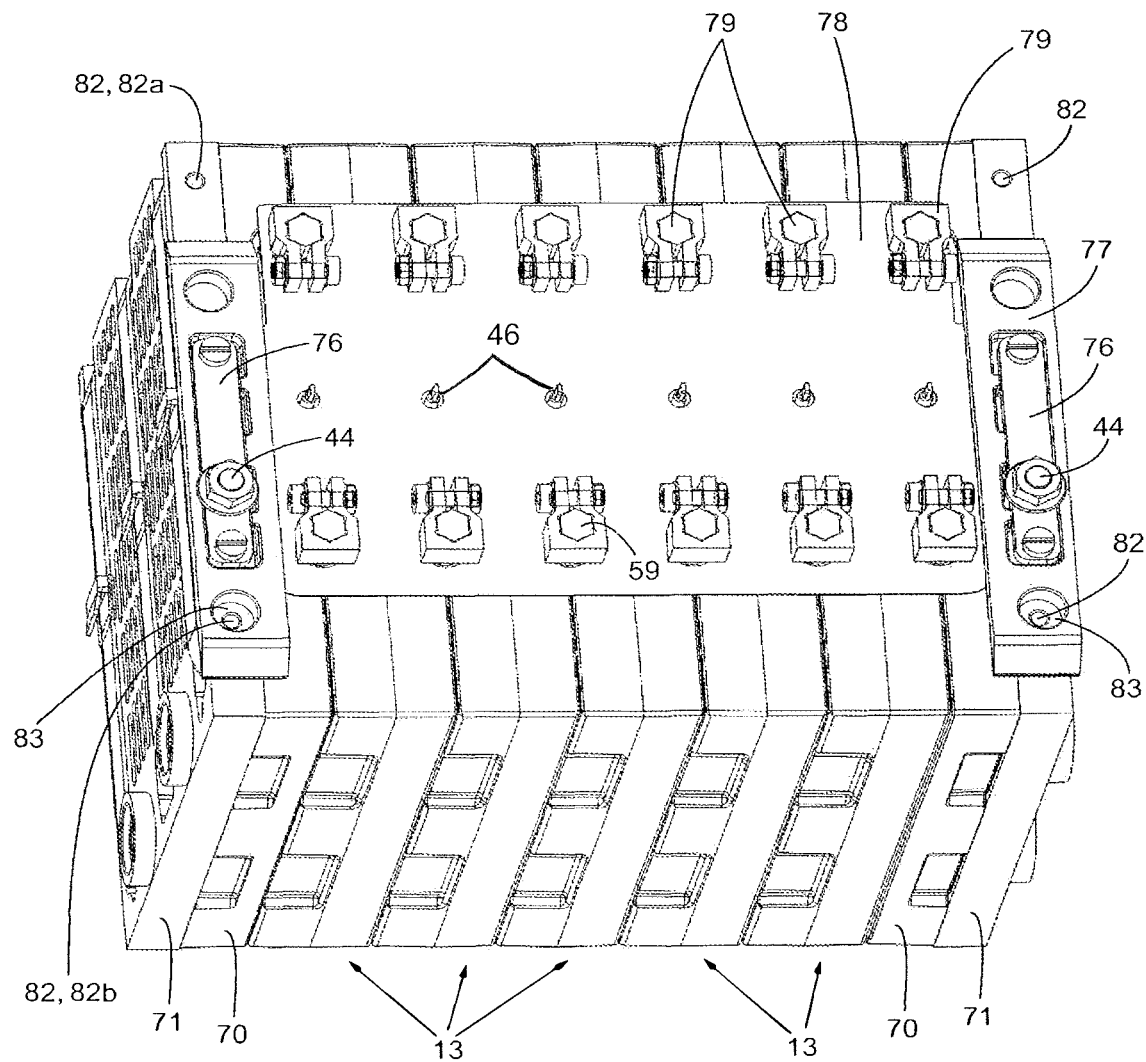
Figure 9B:
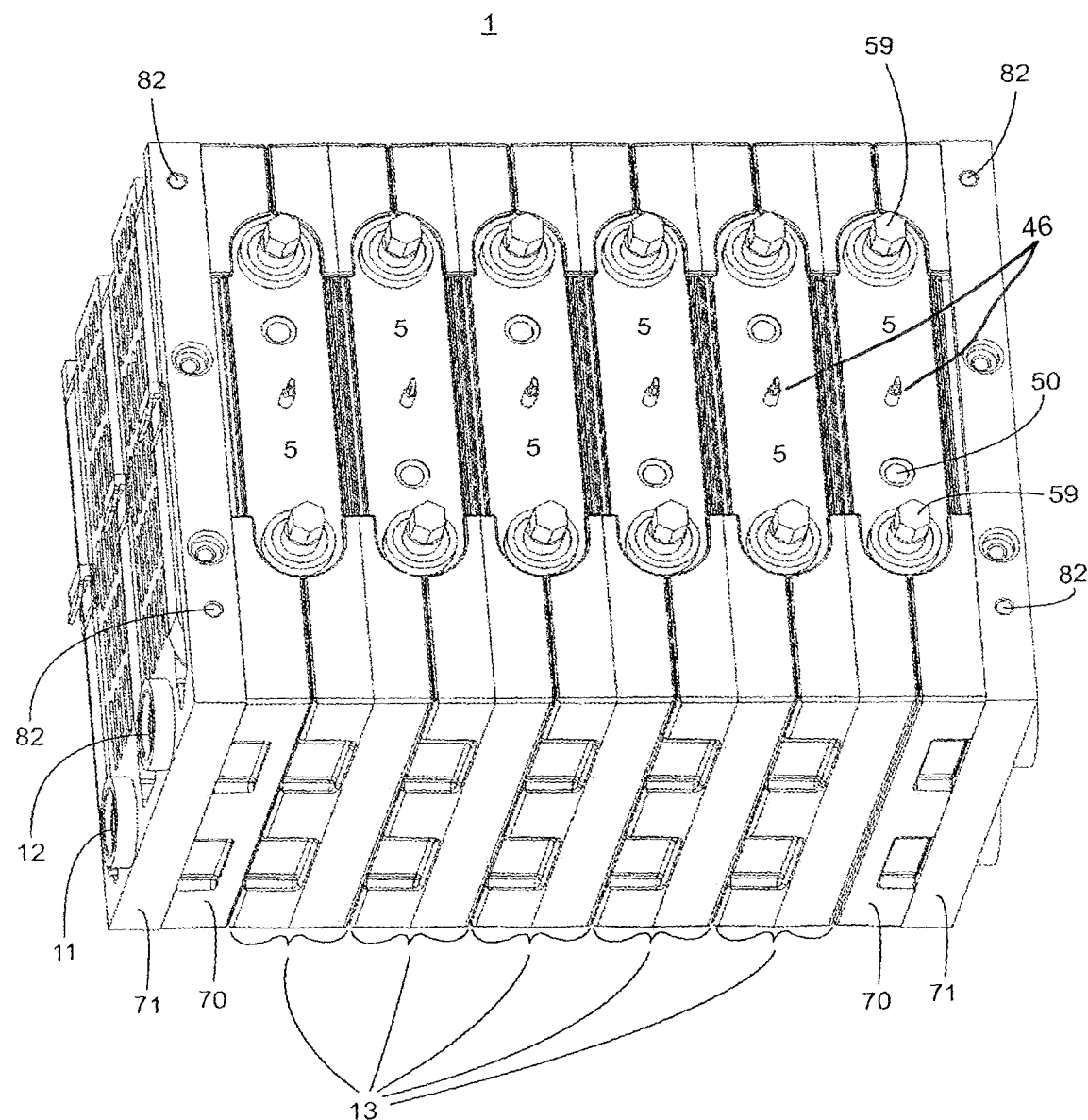
Figure 9C:
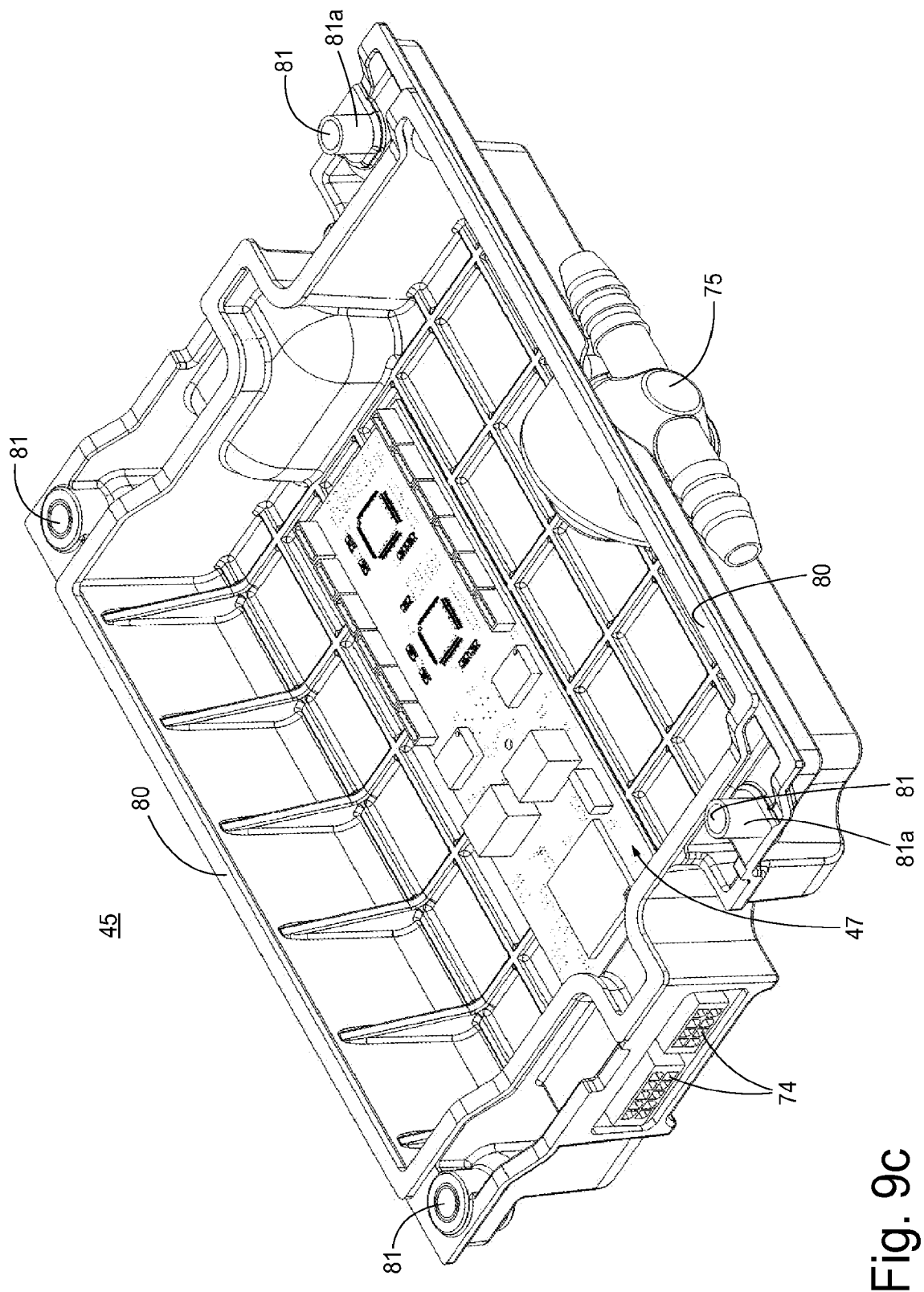
Figure 10A:
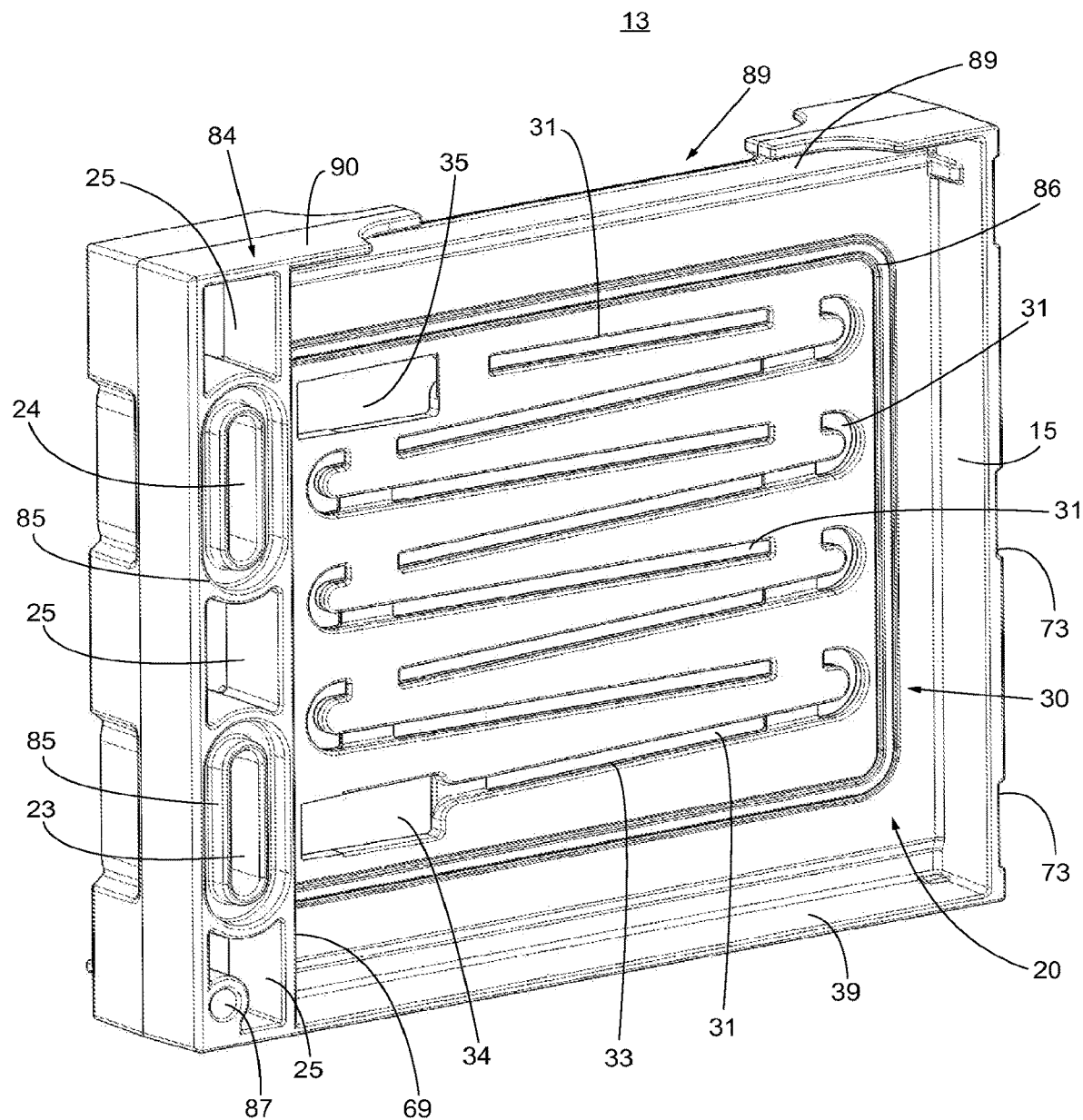
Figure 12A:
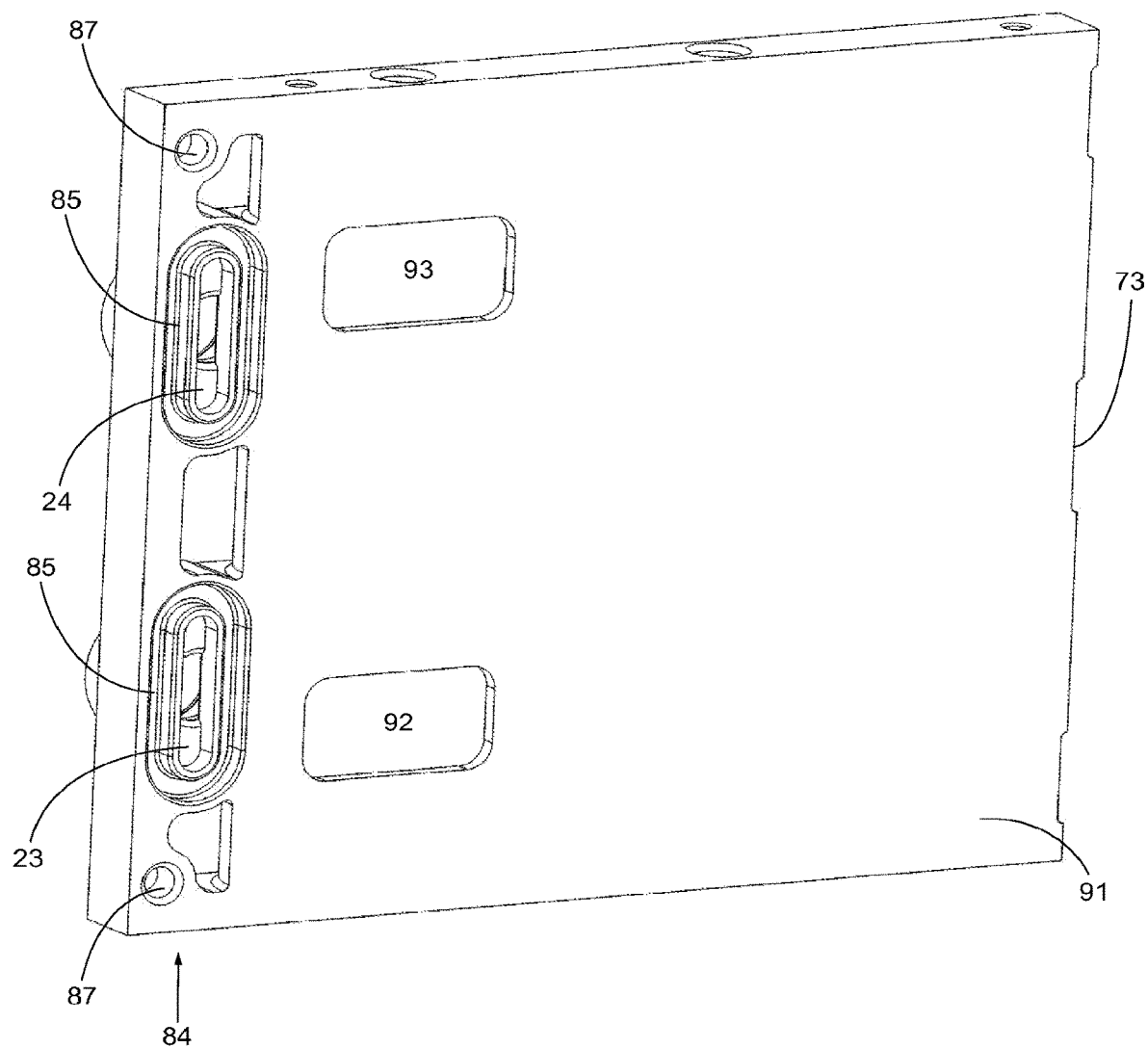

FIGS. 8a, b show the battery module with housing in an overall view including cover;

FIGS. 9a-9c show two overall views of the battery module without cover and the cover itself;

FIGS. 10a, b show an intermediate wall that is positioned between two adjacent battery cells;

FIGS. 11a-11d show several views of a closing wall that forms the end wall of the housing together with an outer wall;

FIGS. 12a, b show the outer wall as part of the end wall;

FIGS. 13a-13d show the different stages in assembly of the battery module.

Figure 1:
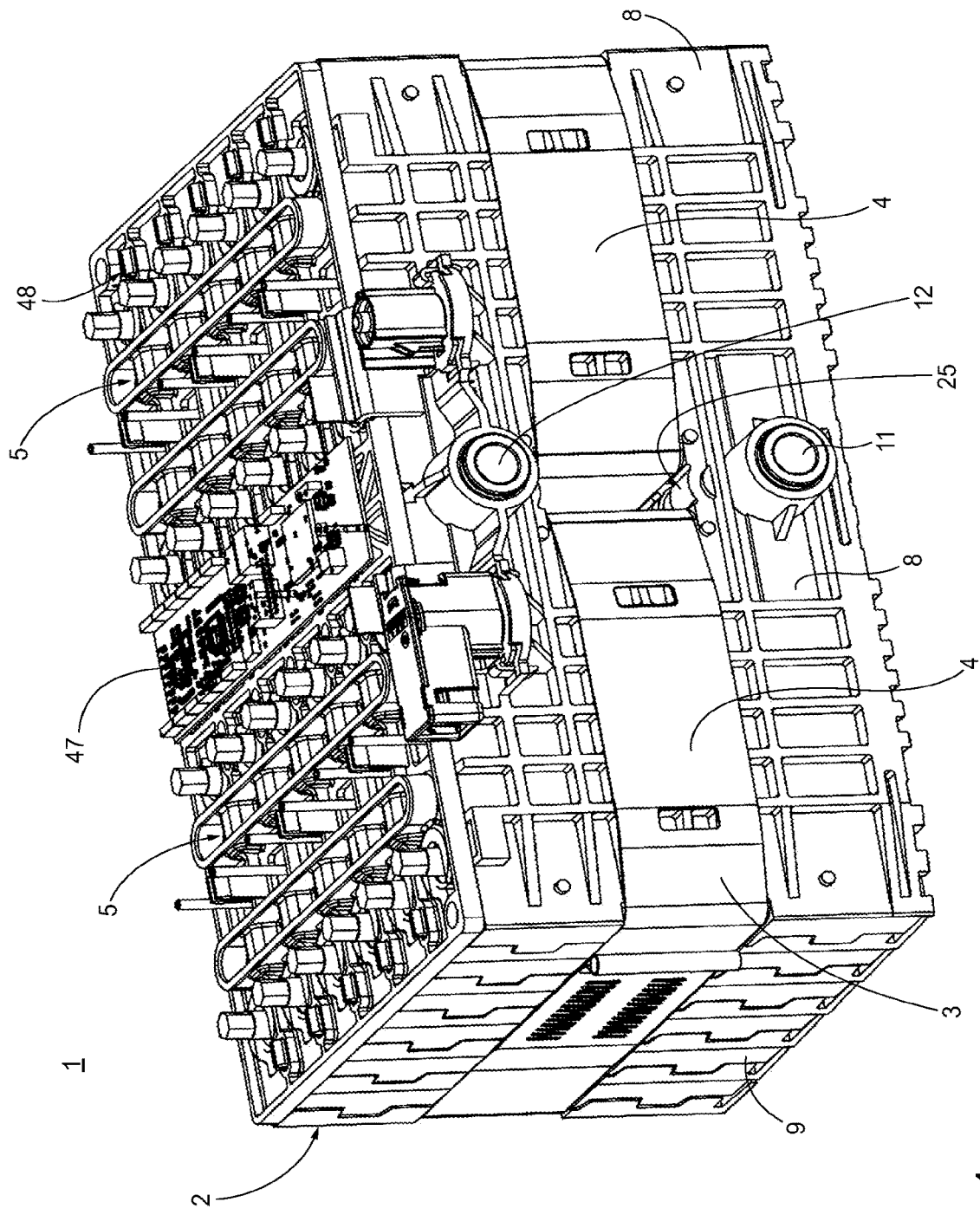
FIG. 1 shows the battery module according to the invention in an overall view with lifted-off cover.

FIG. 1 shows the overall view of a battery module 1 according to the invention without cover. The battery module 1 comprises a battery module housing 2 that is encompassed by a clamping device 3. The clamping device 3 comprises two tension bands 4 made of metal.

The battery module 1 comprises a plurality of prismatic battery cells 5. They are covered at the top here by a cover plate 48, with the electrical connections projecting through corresponding openings. A battery module control electronics unit 47 for controlling the battery module 1 is optionally located in the middle of the cover plate.

The battery cells 5 are arranged in two rows. Six battery cells 5 are arranged in each row, these being electrically interconnected in such a way that a nominal voltage of 38.4 V is achieved with the total of twelve battery cells.

Figure 6A:
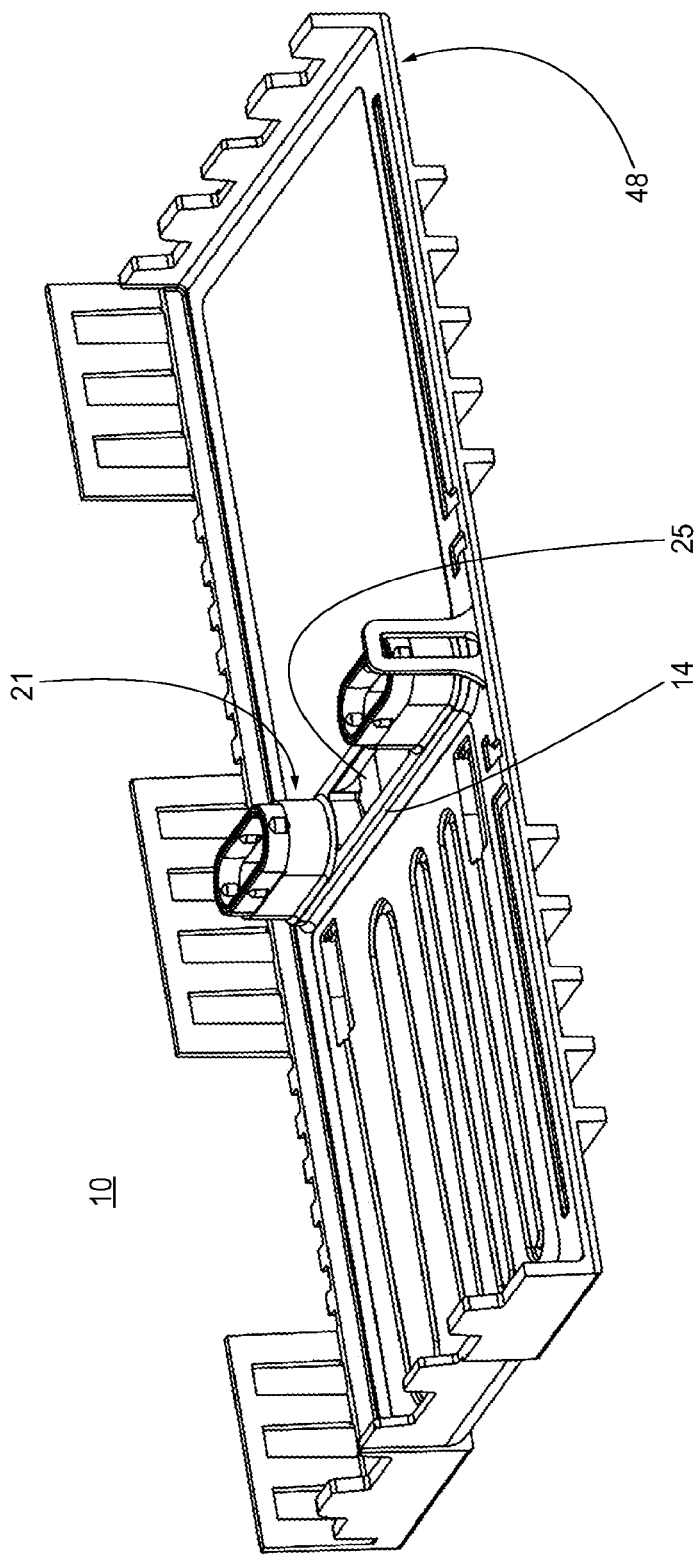
FIGS. 6a-6e show the different stages in the manufacturing process.
Figure 6B:
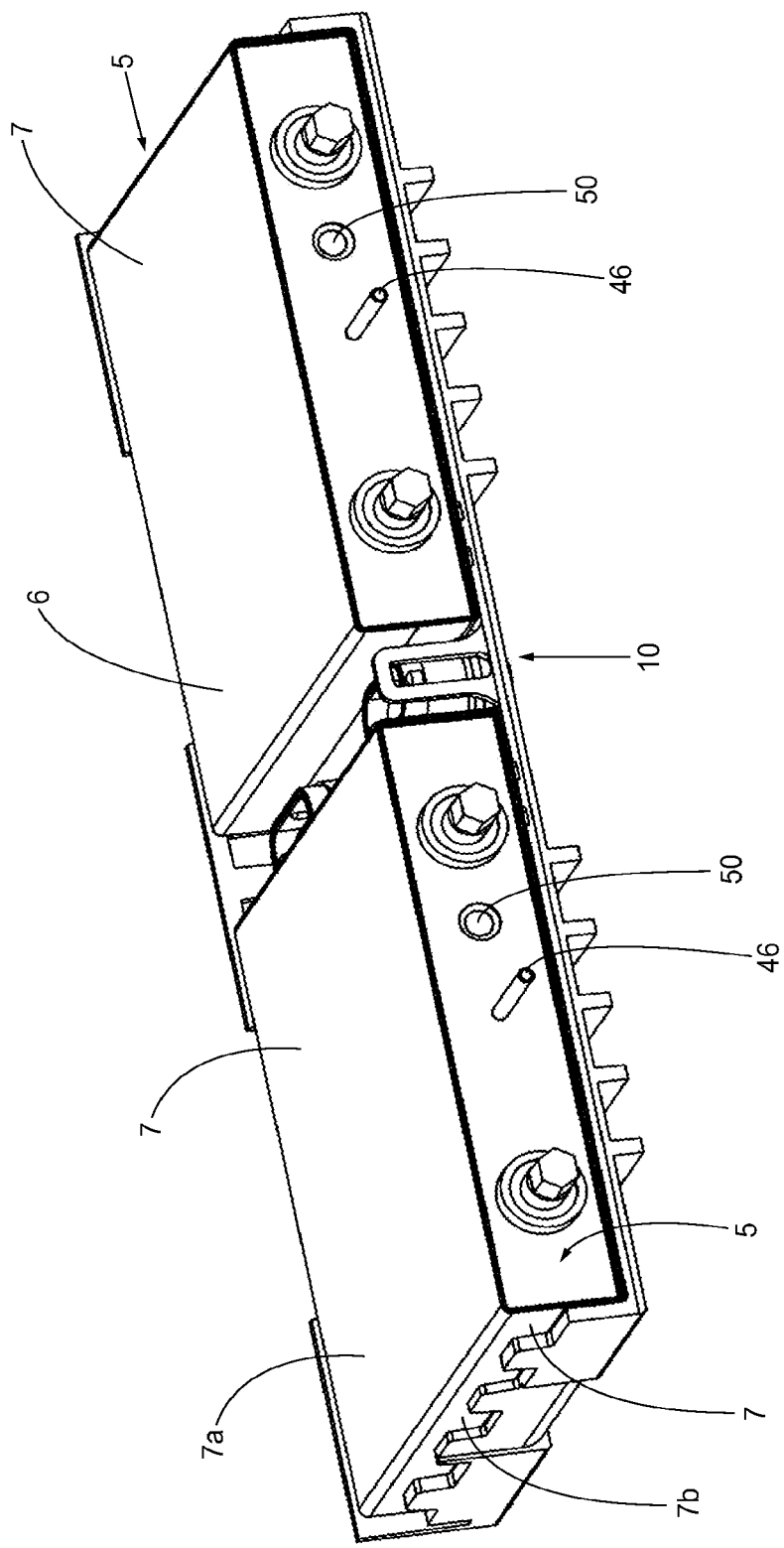
Figure 6C:
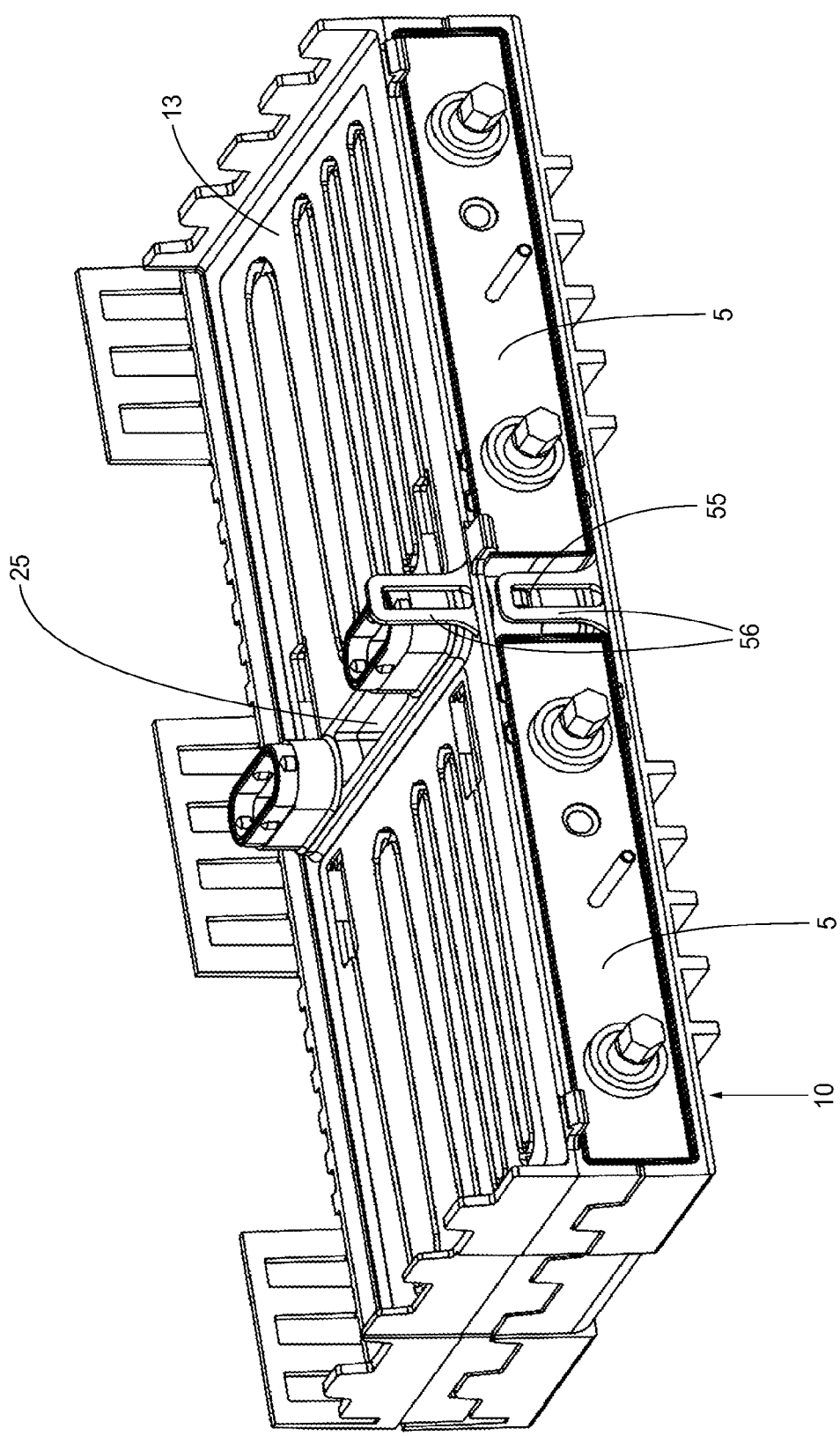
Figure 6D:
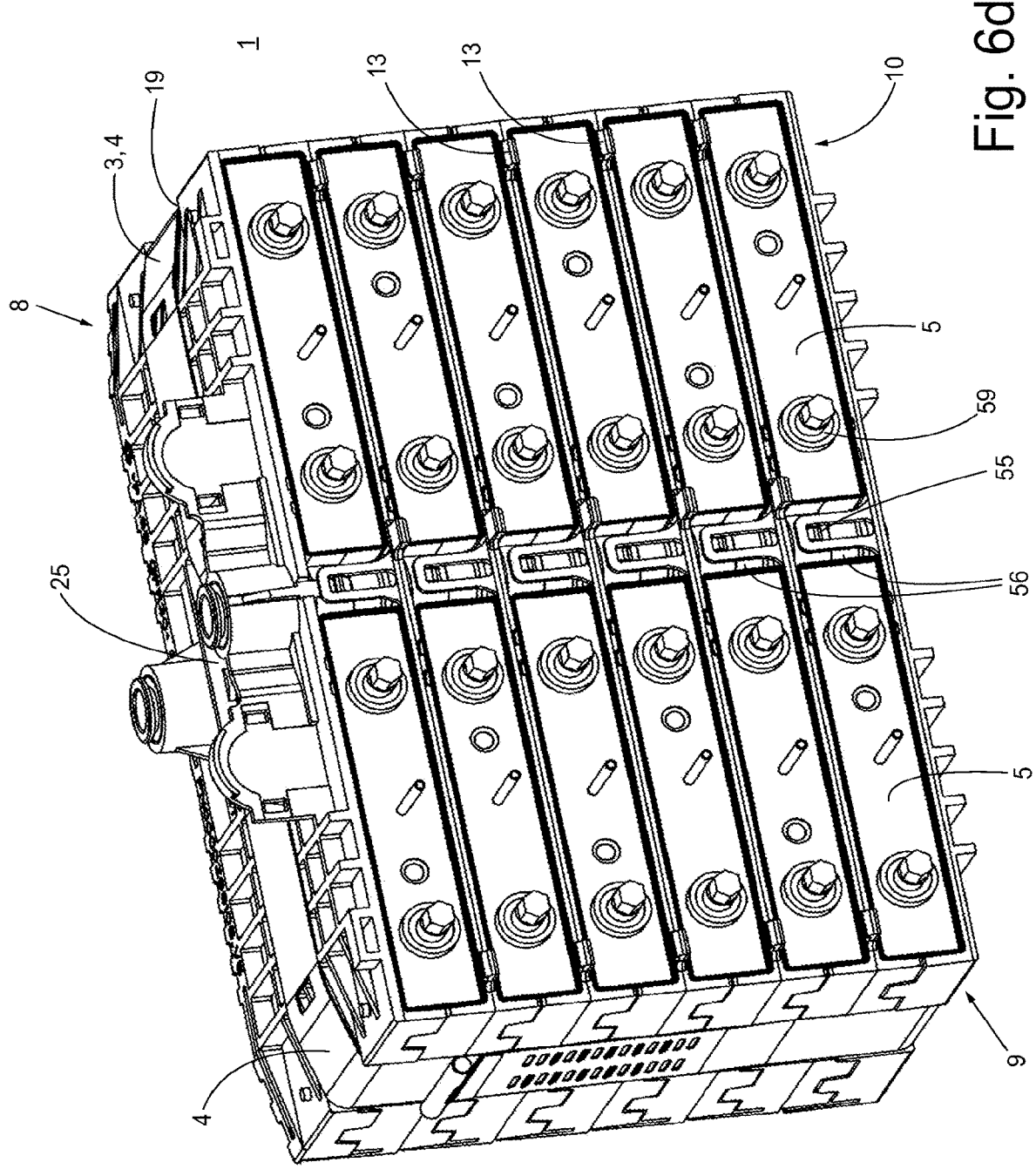

The battery cells 5, which are shown in more detail in FIG. 6b or 6d, have a cell housing 6 with four side walls 7. Two parallel side walls 7a, referred to hereafter as longitudinal walls, are larger than the other side walls 7b, which are referred to as cross walls. The surface areas of the larger side walls 7a of the battery cell 5 are preferably at least four times as large as the surface areas of the other side walls (cross side wall 7b). The surface areas of the longitudinal walls 7a are particularly preferably at least five times as large as the cross walls 7b.

The battery module housing 2 consists of a plurality of parts made of plastic and comprises a front wall 8 (FIG. 4), two battery module housing side walls 9 as well as a rear wall 10 with a rib-like structure made up of a plurality of transverse and longitudinal ribs (FIG. 3). The battery module housing 2 has a cooling system with a channel structure and a fluid, preferably liquid coolant. The channel structure not shown here has a fluid connection with a coolant inlet 11 and a coolant outlet 12 of the battery module housing 2, which are both located in the front wall 8.

Figure 2A:
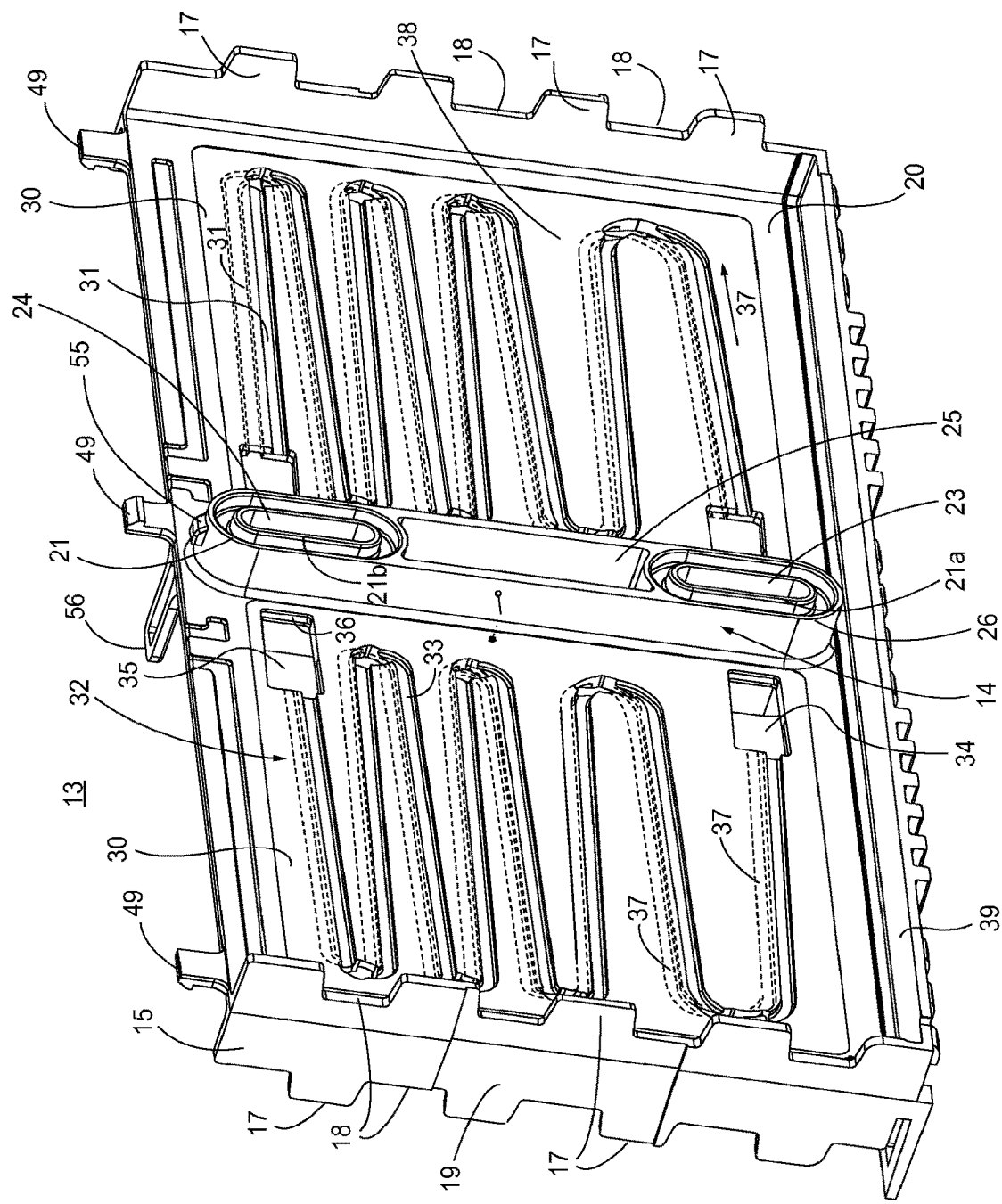
Figure 2B:
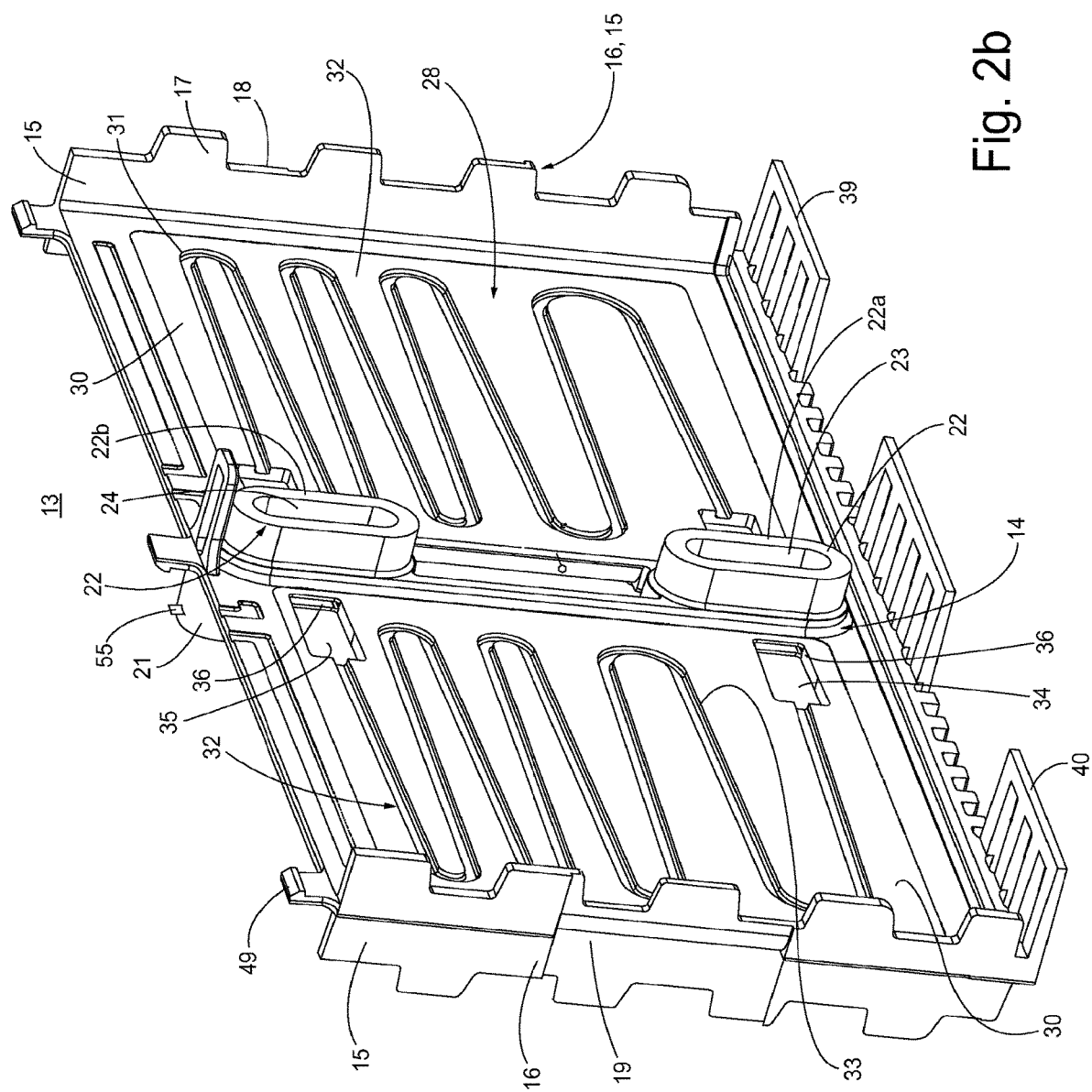

Inside the battery module housing 2, the battery cells 5 are positioned so that one intermediate wall made of plastic, preferably from a thermoplastic, is arranged in each case between two battery cells that are adjacent with their longitudinal sides 7a (FIGS. 2a, 2b). The intermediate wall 13 is arranged parallel to the larger side walls (longitudinal wall 7a) of the battery cell housings 6.

FIGS. 2a and 2b show the intermediate wall 13 in detail. It is preferably symmetrical in order to encompass two battery cells 5 on each side. Asymmetrical intermediate walls are naturally also possible if the battery cells are arranged in only one row or if the cooling fluid feeds are located off-center, e.g. at the side. The battery cells 5 are held between a middle part 14 and one intermediate wall side wall 15 in each case which is located at the end side 16 of the intermediate wall 13. This preferred intermediate wall 13 thus separates a total of four adjacent battery cells 5 from each other.

The intermediate wall side wall 15 is preferably contoured so that it corresponds with the intermediate wall side walls 15 of adjacent intermediate walls 13 in order for them to engage with each other. The intermediate wall side wall 15 partially projects beyond the adjacent battery cells 5. It preferably has a crenellated structure that comprises a plurality of merlons 17. The merlons 17 at one end of the intermediate side wall 15 correspond with the recesses 18 formed between the merlons 17 at the other end of the intermediate wall side wall 15 so that two adjacent intermediate walls 13 can engage with each other. The merlons 17 and recesses 18 could optionally additionally include locking elements in order to permit interlocking of the intermediate walls 13 and further increase the stability of the housing.

The intermediate wall side wall 15 is divided into three parts, with its thickness in the middle part being reduced compared with the thickness in the upper and lower parts of the intermediate wall side wall 15. This forms a guide 19 for the tension band 4.

The middle part 14 of the front side 20 shown in FIG. 2a is realized in the form of a collar-type socket 21 that corresponds with a plug 22 on the rear side 28 of the intermediate wall 13 (FIG. 2b). The socket 21 comprises a distribution channel 23 at its bottom end and a collection channel 24 as well as a through-recess 25 located between the two channels 23, 24. When assembling the battery module housing 2, a plurality of adjacent intermediate walls 13 are fitted together in such a manner that the plug parts of the distribution channel 23 and the collection channel 24 on the rear side 28 of the intermediate wall 13 are inserted in the socket parts of the distribution channel 23 and the collection channel 24. The plug walls 22a and 22b shown in FIG. 2b correspond with the spaces formed between the channel walls 21a and 21b and collar 26 of the middle part 14. The channels of the cooling system 27 can be extended in this way, with the socket 21 and plug 22 fitting in each other to produce a sealed connection.

The intermediate wall 13 has two cooling areas 30 each on the front side 20 and rear side 28, which are located in each case between the middle part 14 and the intermediate wall side walls 15. A channel 31 of the channel structure 32 is located in the cooling area, the channel structure forming part of the cooling system 27 of the battery module housing 2. The channel 31 is formed by means of a recess 33 in the intermediate wall 13. In the preferred embodiment shown here, the recess 33 is designed as a channel 31 that is open on one side, the channel 31 being open towards each adjacent battery cell.

One channel 31 each is located on both the front side 20 as well as on the rear side 28 of the intermediate wall 13, the channel 31 being open on one side. The channels 31 have a connection to the distribution channel 23 at the front end 34 and a connection to the collection channel 24 at their rear end 35. In the embodiment shown in FIG. 2, widened portions are shown at the front and rear ends 34, 35, said widened portions being provided only for technical production reasons. At the ends 34, 35 of the channel 31, a through-passage 36 is located in the widened portion in each case that establishes the fluid connection to the distribution channel 23 and to the collection channel 24. One through-passage 36 is therefore used by both channels 31 that are located in the respective cooling area 30 on the front side 20 and rear side 28.

The channels 31 each have a meander-type form and have a plurality of meander loops. The channel 31 on the front side 20 is slightly offset in downward direction compared with the channel 31 on the rear side, both channels 31 crossing at the turning points of the meander loops. A connection between the two channels 31 at the meander loops is not disadvantageous. This results solely in mixing of the coolant, but the flow direction is maintained.

The channels 31 are formed in such a way that the meander loops become narrower from bottom to top and are thus narrower in the flow direction (arrow 37) of the coolant. The still unused coolant from the distribution channel 23 flows into the channel 31 at the front end 34. Heat dissipation from the battery cells is very good here. The cooling effect of the coolant decreases with the continuing flow direction, this being compensated by the narrower meander loops of the channel 31, so that uniform cooling is achieved over the entire cooling area 30.

The cooling areas 30 of the intermediate wall 13 are covered with a plastic separating layer 38 made of polyamide. This is preferably a transparent PA66 film and is welded by laser onto the cooling areas 30. The intermediate wall 13 is preferably made of a dark plastic in order to optimize the laser welding process.

It can be seen in FIGS. 2a and 2b that the intermediate wall 13 has an intermediate wall base 39 that comprises three contoured tabs 40 on the rear side 28 of the intermediate wall 13. These tabs 40 engage with detent lugs under the adjacent intermediate wall 13 so that the intermediate walls 13 lock together. A locking tongue 56 extends at the top of the intermediate wall 13 on the rear side 28, said locking tongue being located above the middle part 14. The locking nose 55 and the locking tongue 56 of adjacent intermediate walls engage in each other and hold the walls 13 in position. The modular design of the battery module housing 2 does not just result in a high level of flexibility and simple extendibility, but also creates a high degree of stability since the individual intermediate walls 13 can lock together.

FIG. 2c shows a detail drawing of a section through the cooling area 30 of the intermediate wall 13. In addition to the intermediate wall 13, the plastic separating layers 38 as well as the side walls 7 of the cell housings 6 of the adjacent battery cells 5 are also shown.

It can be clearly seen that the two channels 31a, 31b open to one side in the channel structure 32 are offset with respect to each other in the intermediate wall 13. The section in FIG. 2c shows the channels in the upper part of the cooling area 30 where the meander loops are already close together. The channels 31a, 31b are covered and closed on their open side in each case by the separating layer 38. The plastic separating layer 38 has a much lower thickness than the intermediate wall 13. This ensures good heat transfer from the battery cell side wall 7 to the coolant in the channel 31.

FIG. 3 shows the rear wall 10 of the battery module housing 2. Its design is similar to the intermediate wall 13. Its front side 20 corresponds to the front side 20 of an intermediate wall 13. The rear wall 10 has a through-recess 25 for a clamping device or a tension band that passes through the corresponding recess in the intermediate walls 13. However, there is only one channel 31 each in each cooling area 30 in the rear wall 10. The channel 31 is open towards the inner side of the rear wall 10. It is closed at the side by a plastic separating layer 38. The thickness of the rear wall 10 is therefore preferably less than the thickness of the intermediate wall 13. The distribution channel 23 and the collection channel 24 for the coolant are each realized as an end piece and do not have a through-bore like in the intermediate walls. The coolant is routed from the distribution channel 23 only into the two channels 31 in the rear wall 10 and from there into the collection channel 24.

The rear wall 10 has several reinforcements 41 on the outer side in the form of transverse and longitudinal struts. The transverse struts are preferably realized as vertical ribs 42. The reinforcements 41 on the outer side of the rear wall 10 preferably correspond to the reinforcements 41 on the front wall 8, which is shown in FIG. 4. These reinforcements 41 are distributed in this embodiment as vertical and horizontal ribs 42 over the outer side of the wall 8 and counteract deformations. They simultaneously serve the purpose of pressure absorption in order to absorb the pressures produced inside the battery module housing 2 and increase the stability of the housing. The end walls (front wall 8 and rear wall 10) are optionally thicker than the intermediate walls 13 if high pressures and high stability are required.

The front wall has a similar design to the rear wall 10. It also has channels 31 only in one plane, namely on its inner side. The channels 31 are preferably open towards the inner side and are closed at the sides by a plastic separating layer 38 like the channels 31 in the intermediate walls 13. There are no two adjacent channels 31 located in the thickness of the wall 8.

Like the rear wall, the front wall 8 also has a through-recess 25 for a tension band 4. Compared with the rear wall 10, the front wall 8 additionally has the coolant inlet 11 and coolant outlet 12 on the outer side. In a preferred embodiment, the coolant inlet 11 and the coolant outlet 12 comprise a quick-action coupling 58, as can also be seen in FIG. 5. The quick-action coupling 58 permits simple connection without tools to an external cooling system with a cooling tube. Through suitable material selection for the cooling system including the front wall 8, the rear wall 10 and the intermediate wall 13, it is possible to perform cooling not just with water, but also with a different coolant, e.g. water-glycol mixtures. If the battery module is used in a motor vehicle, for example, the coolant used for other cooling purposes, e.g. the air-conditioning system, can be used. It is also possible to use gaseous cooling media; air or also $SO_2$ can be used, for example.

Figure 5:
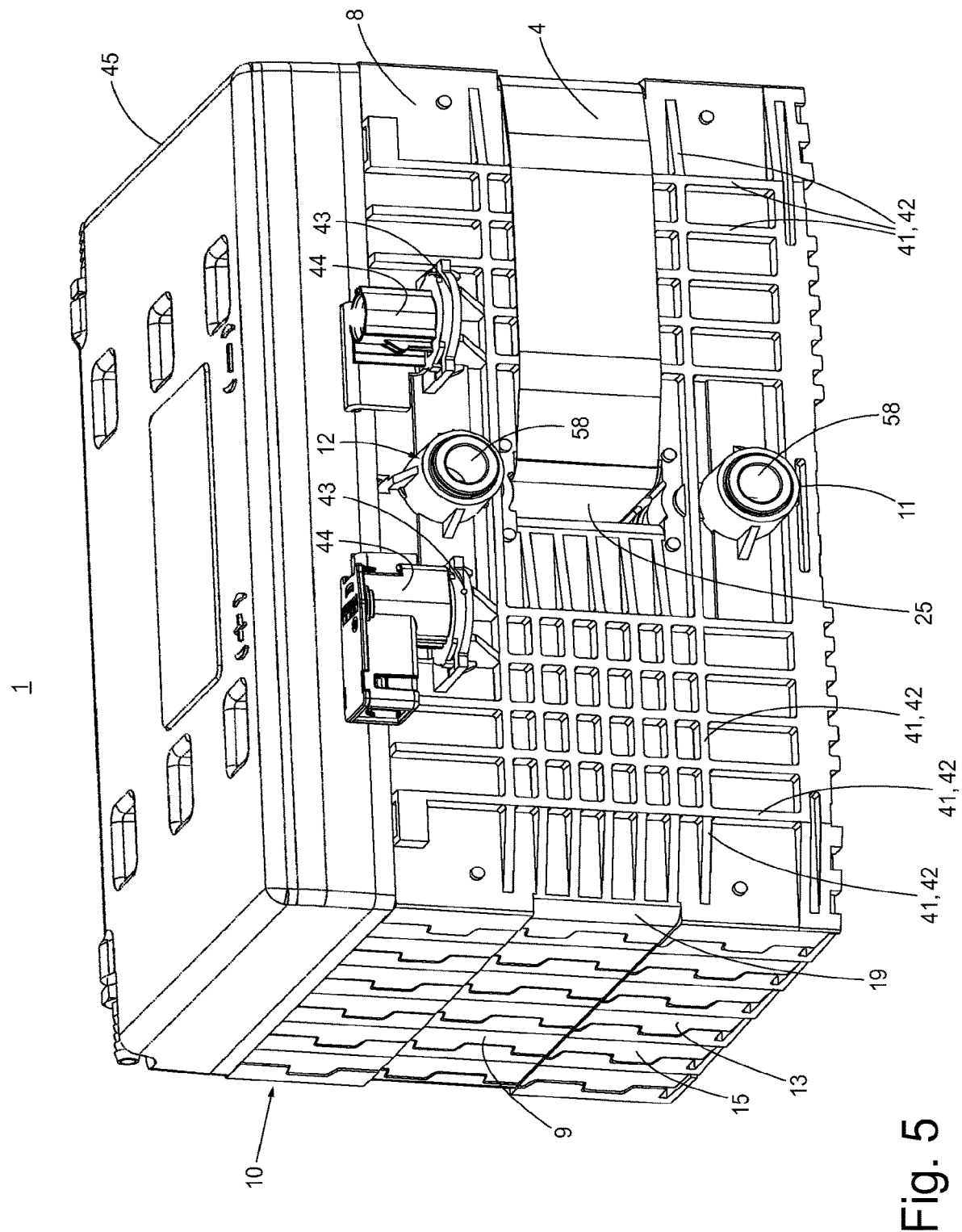
FIG. 5 shows an overall view of the battery with cover.

It can be seen in FIGS. 4 and 5 that the front wall 8 has two mountings 43 on which the electrical connections 44 are located. These are protected by a cover.

For illustrative purposes, the battery module 1 is shown in FIG. 5 with only one tension band 4 that encompasses one row of battery cells 5 and the corresponding housing parts. The tension band 4 is routed through the through-recess 25 between the battery cell rows and clamps a part of the front wall 8 and the rear wall 10 and the one battery module side wall 9. The tension band is routed over the rib-like reinforcements 41, 42.

The battery module 1 is covered by a cover 45 that protects the parts and components located underneath, such as the battery module control electronics unit 47. The battery module control electronics unit 47 can be located in the battery module housing 2 or in the cover. It is particularly preferably located above the cover plate 48 (FIG. 1).

The cover plate 48 made of plastic is located above the intermediate walls 14 and battery cells 5. It is engaged at the top of the intermediate walls 13 by means of locking hooks 49 (FIGS. 2*a* and 2*b*). This improves the stability of the entire battery module housing 2.

Figure 6E:
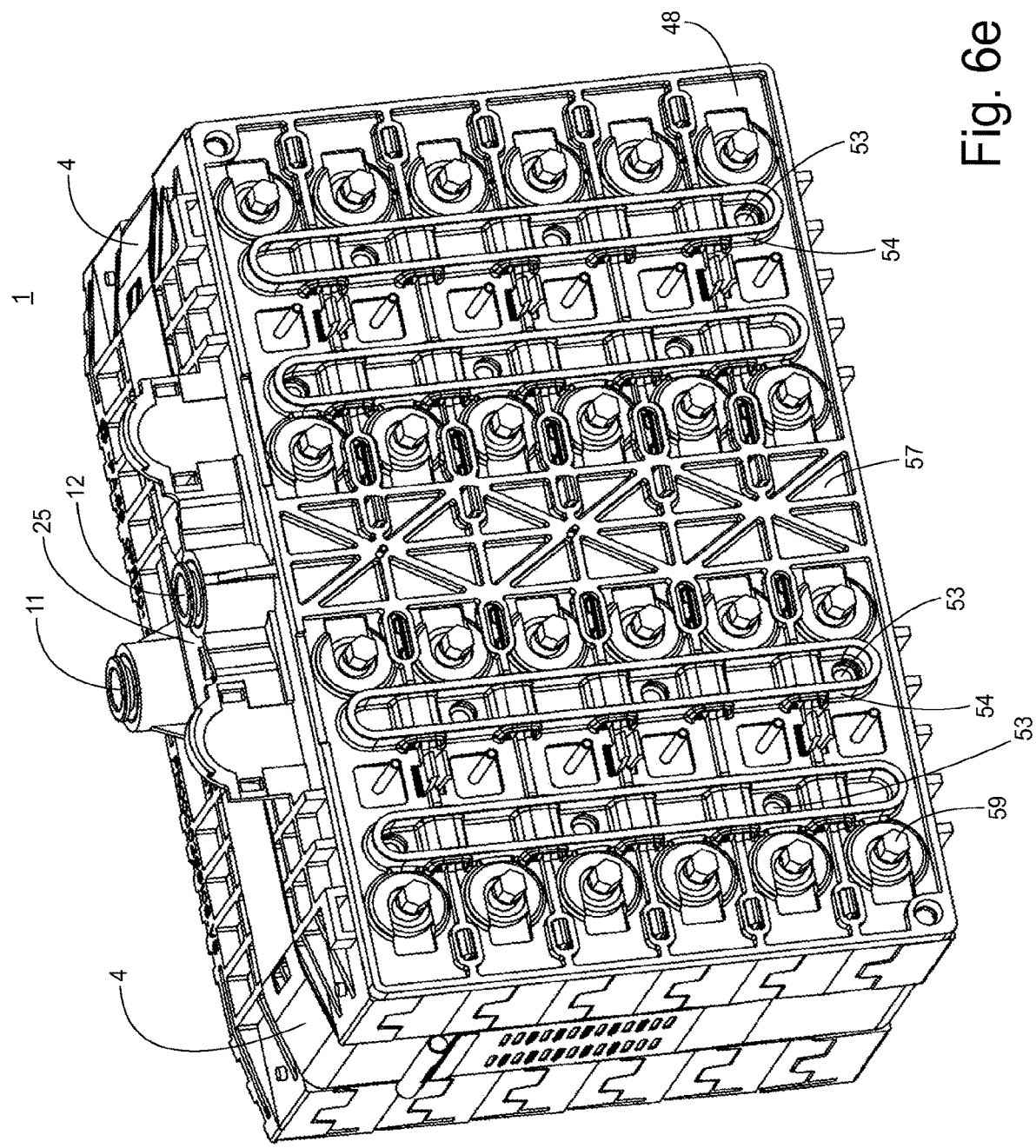
Figure 7:
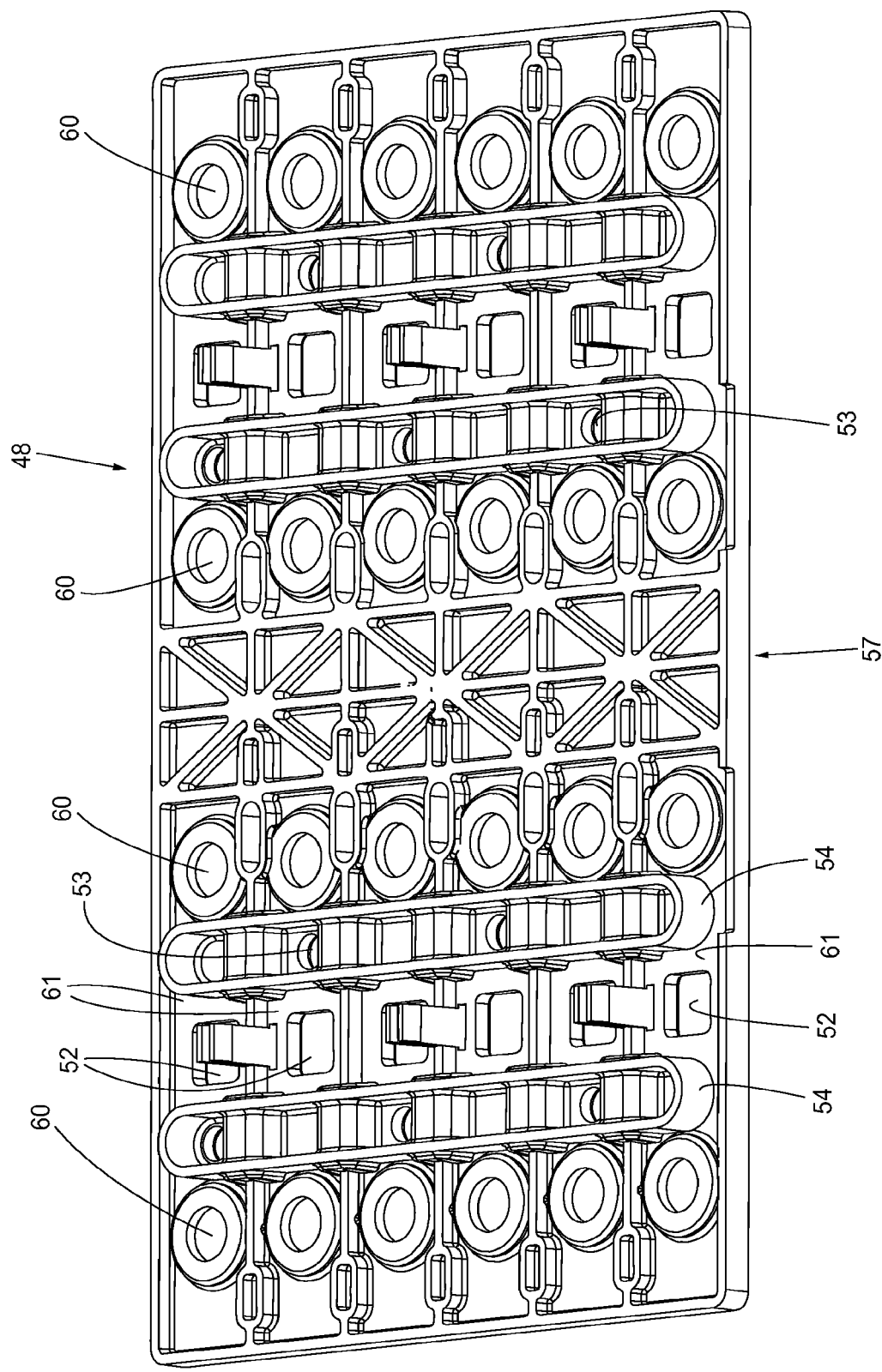
FIG. 7 shows a cover plate of the battery module.

The cover plate 48 shown in FIG. 7 has corresponding openings 60 for the electrical connections 59 of the battery cells 5, openings 52 for the electrolyte filling connections 46 (FIG. 6*b*) for filling the battery cells 5 with the electrolyte as well as further openings above the pressure relief openings of the battery cells 5 realized in the form of blow-out disks 50 (FIG. 6 *b*). The electrolyte filling connections 46 of the battery cells 5 are designed in the form of tubes, which are routed through a filling connection opening 52 in the cover plate 48.

A cavity-like recess 61 is arranged around the connection filling opening 52 in order to collect excess electrolyte fluid if it emerges during filling. The electrolyte fluid cannot come into contact with the battery cell housing 6 and can be easily removed during assembly or after filling the respective battery cell. This is particularly advantageous if the battery cells 5 are filled only after assembly in the battery module housing 2.

The cover plate 48 has a plurality of collar-type frames 54 on the upper side that are located between the filling connection openings 52 and the through-openings 60 for the electrical connections 59 of the battery cells 5 and surround the blow-out disk openings 53 of the cover plate 48. The collar-type frame 54 is sealed with respect to the cover 45 so that any gases that escape in the event of excess pressure upon bursting of the blow-out disk 50 are kept within the frame 54 and cannot escape into the environment in an uncontrolled manner. Compared with the known devices for collection of gases escaping from battery cells, e.g. U.S. Pat. Nos. 5,643,691 or 7,504,175 B2, the collar-type design of the frame is very effective and at the same time of very simple design. The collection chamber formed by the frame 54 and housing cover 45 reliably holds any escaping gases.

The battery module housing 2 can optionally have two outlet valves in the cover 45 in order to route the gases collected in the collar-type frame 54 to the outside. Where appropriate, discharge takes place in a controlled manner into the environment, for example into the environment outside a motor vehicle or another operating location of the battery module. The gases can also be alternatively collected in an external collection container.

Since the adjacent battery cells 5 are positioned turned by 180 degrees so that a positive terminal is located next to a negative terminal of the adjacent battery cells, the off-center blow-out disks 50 are also located alternately on the right or left of the electrolyte filling connections 46. For this reason, the cover plate 48 has a total of four collar-type frames 54.

FIGS. 6*a* to 6*e* show the assembly process of a battery module 1. First, assembly is started by placing the rear wall 10 with its outer side on a supporting surface (FIG. 6*a*). Two battery cells 5 facing in the same direction are then placed in the holders formed between the middle part 14 and the side walls (FIG. 6*b*).

In a further step (FIG. 6*c*), an intermediate wall 13 is placed on the battery cells 5 and engaged with the rear wall 10. The plug 22 of the intermediate wall 13 projects into the socket 21 of the rear wall 10 in such a manner that a sealed connection is produced between the respective distribution channel pieces 23 and collection channel pieces 24. The merlons 17 and recesses 18 of the intermediate wall side walls 15 engage in each other and form a battery module housing side wall part.

In the next assembly step, two battery cells 5 are again placed on the intermediate wall 13, with the battery cells 5 being positioned in each stack in such a manner that a positive terminal of the bottom cell 5 is adjacent to a negative terminal of the upper cell 5 in each case. This is again followed by fitting of a further intermediate wall 13 until a stack has been formed with a total of two rows each with six battery cells 5. Two adjacent intermediate walls 13 lock together in each case. In the locking process, a locking nose 55 of an intermediate wall 13 engages in the locking tongue 56 of the next intermediate wall 13. The bases of the adjacent intermediate walls 13 additionally interlock. The same also takes place between the intermediate wall and end walls.

The front wall 8 is assembled as the last step, said front wall being placed on the last level of the battery cells 5 and engaged with the intermediate wall 13 located underneath (FIG. 6*d*). The battery module housing side wall 9 and the battery module housing base (not shown) are formed by assembly of the front wall 8, intermediate walls 13 and the rear wall 10. The clamping device 3, which comprises two tension bands 4, is fitted in order to further increase the stability of the battery module housing 2. Each band 4 is clamped around one row (stack) of battery cells 5, with the tension band 4 passing through the respective through-recesses 25 and being guided in the middle area of the side wall in the guide 19.

FIG. 6*d* shows how the adjacent intermediate walls lock together at the top end. As an additional locking mechanism, the locking nose 55 at the top end of the socket 21 engages in the corresponding locking tongue 56 of the intermediate wall 13.

Finally, FIG. 6*e* shows the battery module housing 2 with fitted cover plate 48. In order to finally complete the battery module 1, the individual terminals (electrical connections 59) of the battery cells are then connected with each other and the connection terminals 44 for the battery module 1 are installed. The battery module control electronics unit 47 is optionally positioned in a center holder 57 on the cover plate 48. Adjusting of the cover 45 completes assembly.

An electrical connection for the battery module control electronics unit 47 is optionally provided in the cover 45 of the battery module housing 2. This can be a bus line such as a CAN bus, for example.

In order to obtain higher voltages and/or capacities, several battery modules 1 can be connected together, e.g. in a motor vehicle. The resultant battery then consists of one or a plurality of battery modules 1. The battery cells, battery module and the entire battery can be controlled individually or in combination. For example, safety cutoff of individual battery modules is possible. Bridging of the corresponding battery modules could also be controlled via the battery module control electronics or battery control electronics. For example, through suitable connection of the battery cells 5 in the battery module 1 and corresponding control via the battery module control electronics unit 47 and/or battery control electronics, it is possible to implement a safety circuit such as is disclosed, for example, in WO 2011/095630 A1.

The battery module can be installed in a motor vehicle, for example, and connected there with further battery modules and/or connected to the vehicle electronics. Connection also additionally takes place to a vehicle cooling system by connecting a coolant tube to the coolant inlet 11 and a further tube to the coolant outlet 12.

The battery module according to the invention is also suitable for use in other applications than in a motor vehicle. For example, the battery module can also be used for energy storage and energy feeding into a medium- and/or low-voltage network or for decentralized energy storage in combination with installations for exploiting renewable energies. The battery modules according to the inventions can also be used, for example, as an uninterruptible power supply (UPS) or as an emergency power supply. A further possible application is stabilization of isolated networks. Here, several battery modules are preferably connected together. The desired energy content, voltage levels or required currents are then reflected in the configuration of the individual battery modules and the internal arrangement of the battery cells.

It is of course possible to configure the battery module differently to the configuration shown here. For example, a plurality of battery cells can be combined with each other in such a manner that, with a two-row arrangement of the battery cells 5, also modules with three, four or nine battery cells are arranged in two rows each. A battery module can be optionally configured that has only one row of battery cells 5, and six, nine, twelve or 18 cells can then be combined with each other, for example. A preferred embodiment combining six cells in series is described below. With a single-row arrangement of the battery cells 5, the distribution channel 23 and collection channel 24 are located at the side of the battery cells 5. The distribution system for the coolant must then be adapted correspondingly.

In the context of the invention, a battery module 1 with twelve battery cells 5 connected electrically in series was investigated in more detail by way of example. The battery cells 5 are arranged in two rows each with six cells 5. It was found that the channel structure 32 of the cooling system in the battery module housing 2 is preferably designed in such a manner that, with a correspondingly dimensioned external coolant pump, the coolant flows in the channel 31 in the battery module housing 2 with a flow rate of at least 1 liter per minute, preferably at least 1.5 liters per minute. In a particular embodiment, the flow rate is at least 1.6 liters per minute.

Investigations have shown, for example, that with such a flow rate the temperature in the cells is regulated to a maximum of 40° C., assuming a coolant temperature of 25° C. In uncooled condition, the temperature of a battery cells with an $SO_2$-based electrolyte solution would increase to over 60° C. with a constant discharge current of 100 A. Such an increase in temperature leads to an increase in pressure. The resultant pressure is transferred to the battery cell housing 6 and the battery module housing 2 so that—in uncooled operation of the battery module—deformations of more than 2.5 mm and partially up to over 3 mm can occur. Such forces are avoided by the efficient cooling. Furthermore, the clamping device prevents damage or deformation of the battery module housing.

FIGS. 8a-8b, 9a-9c, 10a-10b, 11a-11d, 12a-12b, and 13a-13d show a further alternative but also preferred embodiment of the battery module according to the invention. In this embodiment, the individual battery cells are arranged only in one row and not in two adjacent rows like in the previous embodiment according to FIGS. 1 to 7. Six battery cells 5 are also arranged in a row in this embodiment of the battery, the battery cells being electrically connected with each other in order to obtain a total nominal voltage of 19.2 V.

FIG. 8a shows a front view of the battery module 1, which comprises a battery module housing 2. The battery module housing 2 comprises several parts made of plastic, which are formed by a plurality of intermediate walls 13 as well as a front end wall 8 and a rear end wall 10. The individual walls are encompassed by three tension bands 4 made of metal which form a clamping device 3.

The end walls 8, 10 are each formed by a closing wall 70 and an outer wall 71, which are shown in FIGS. 11a-11d and 12a-12b. All walls (closing wall 70, outer wall 71, intermediate wall 13) have a through-recess 25 for each tension band 4 through which said tension band 4 is routed. At the side wall of the outer wall 71 at a distance away from the through-recess 25, a guide rounding 72 is provided for each tension band 4 to guide the tension band 4 and avoid a sharp edge. The two closing walls 70 and the intermediate walls 13 have a guide recess 73 at their sides or end sides 16 in which the tension band 4 is laterally guided.

Figure 8B:
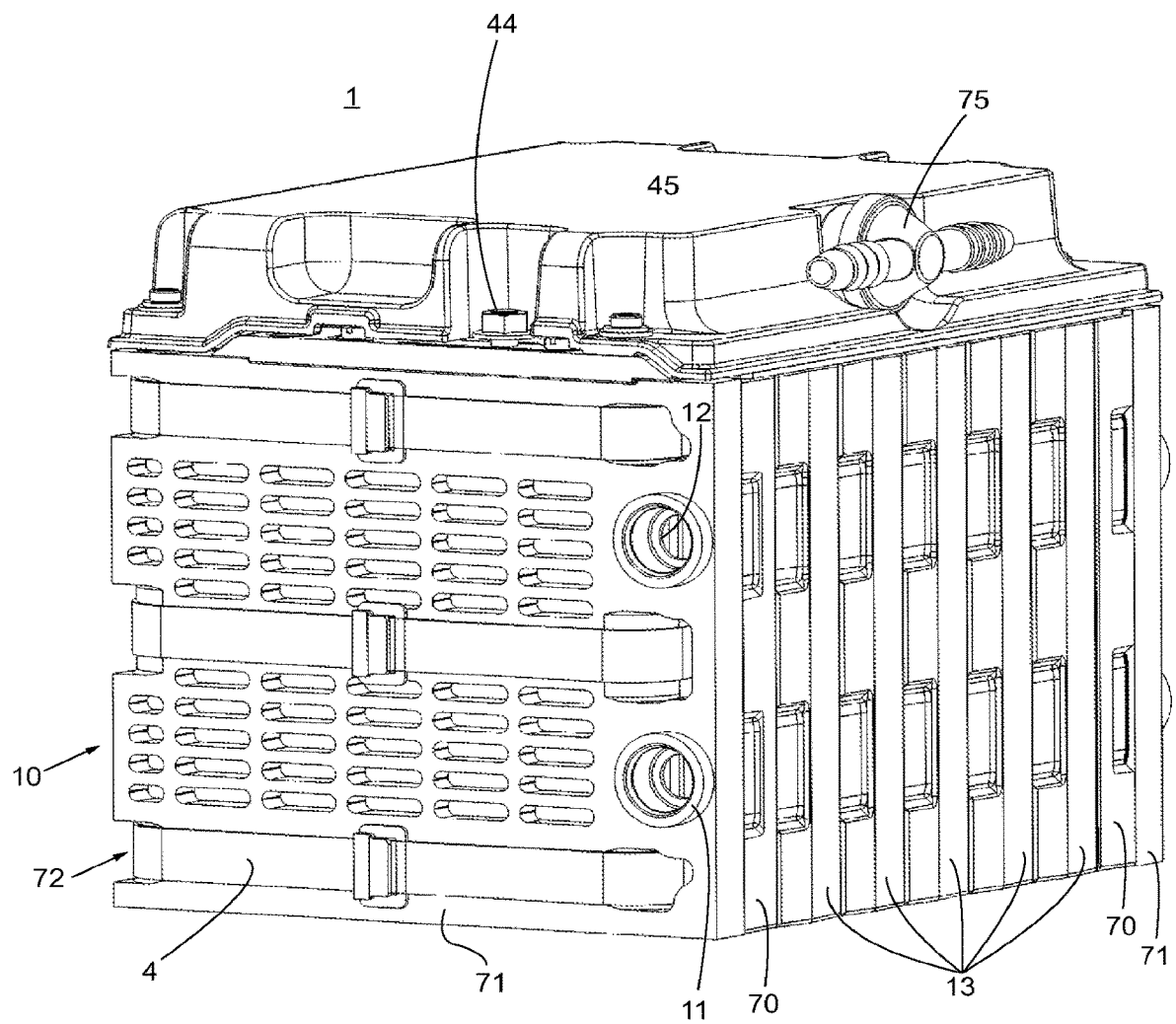

FIGS. 8a and 8b show that the connections for the coolant are realized at the sides. The coolant inlet 11 is located in the bottom half of the battery module 1, whereas the coolant outlet 12 is arranged in the upper part. The coolant inlet 11 and coolant outlet 12 are each arranged as a round bore with a collar. A connecting piece is inserted in these in order to permit connection to the coolant system. The connectors are preferably designed such that the coolant system can be connected with a quick-release closure. Alternatively, individual connections for the coolant can also be closed off with a suitable closure, e.g. a sealing plug, blind plug or another suitable closure. If the battery is used as a single energy source, the coolant inlet 11 on the front side 8 is connected with the coolant system. The coolant outlet 12 on the front side 8 is sealed with a plug. On the rear side, the coolant inlet 11 is sealed with a plug, whereas the coolant outlet 12 is connected to the coolant system. A uniform and even flow of the coolant through the battery module housing 2 is guaranteed in this way.

If a plurality of batteries are coupled fluidically, a connecting piece or connector is fitted in the coolant inlet 11 and the coolant outlet 12 on each side that establishes a sealing closure with respect to the coolant inlet 11 or outlet 12. The connectors may be a so-called plug-and-seal connector, for example, such as manufactured by the company Freudenberg. Such a connector comprises a cylindrical tube provided with a plastic jacket, for example a rubber coating, which establishes both the fluidic connection between two adjacent battery modules 1 as well as a seal towards the environment. The distribution channel 23 and the collection channel 24 of two batteries 1 are coupled with each other in this way. In this case also, the coolant outlet 12 on the front side 8 of the first battery 1 is sealed with a plug. On the last battery of the coupled row of batteries, the coolant inlet 11 on the rear side 10 is sealed. The coolant inlet 11 on the front side 8 of the first battery is connected to the coolant system, as is the coolant outlet 12 on the rear side 10 of the last battery 1.

FIG. 8*b* shows the rear side of battery module 1. The tension band 4 is closed in each case with its two ends. In the embodiment shown here, the ends of the tension band 4 are crimped together. Crimping is preferably performed with a tool, for example special crimping pliers. The tension band 4 can be closed quickly and easily in this way, with the required tension of the tension band 4 being achieved. In the case of automated closing of the tension band, this can be performed by an automatic tool.

The cover 45 produces a sealing closure with the battery housing 2. The cover 45 has an electronics connection 74 on its front side (FIG. 8*a*) so that the battery control electronics 47 can be connected with an external control unit or with other battery control electronics of further battery modules.

A connecting device 75 is located at the side of the cover 45 that receives gases escaping from the battery cells 5 in the event of a fault and routes them into a collecting device where the gases can be absorbed, neutralized or stored.

FIGS. 9*a* and 9*b* show the battery module 1 with removed cover 45. FIG. 9*b* shows the six battery cells 5 with their electrical connections 59, the blow-out disks 50 as well as the electrolyte filling connections 46. FIG. 9*c* shows the cover 45.

A cover foil 78, which corresponds to the cover plate 48 of the first embodiment, covers the top side of the battery cells 5. This has several recesses through which the electrical connections 59 of the battery cells 5 extend. The cover foil 78 serves to provide electrical insulation towards the environment. Further recesses can be optionally provided in the cover foil 78, said recesses preferably corresponding with the blow-out disks 50 of the battery cells 5 so that, in the event of a fault where a blow-out disk 50 opens, any escaping gases from the damaged battery cells 5 can escape into the inside of the cover 45. If no recesses are provided, the gases escape below the cover foil 78 via its edges, since the cover foil 78 only rests on the battery cells 5 and the top sides of the intermediate walls 13.

The escaping gases are enclosed by the battery cover 45 since the cover 45 has a sealing connection with the battery housing 2. A seal 80 is provided on its underside for this purpose, as shown in FIG. 9*c*.

The outer walls 71 of the battery housing 2 have a plurality of bores on their top side that allow an electrical connection plate 76 to be screwed on. The connection plate 76 is preferably a copper rail and comprises the electrical connection 44 for tapping the battery voltage. The connection plate 76 is surrounded by a retaining element 77 made of plastic in order to produce electrical insulation. The individual battery cells 5 are connected in series with each other via the connection terminals 79. One of the copper rails 76 is connected with the connection terminal 79 of the first battery cell 5 of the series circuit. The other copper rail 76 is connected with the connection terminal 79 of the last battery cell 5 in the series circuit at the opposite battery pole referred to the first battery cell.

The battery cover 45 is screwed together with the battery housing 2, the screws being screwed into retaining bores 82 in the outer wall 71 through retaining openings 81 on the cover 45. Two screws are screwed directly into the retaining bores 82*a*. Two further screws are screwed into the retaining bores 82*b* in the outer wall 71 through through-openings 83 in the retaining element 77. The retaining openings 81 on the cover are provided with cylindrical flanges 81*a* for this purpose which project into the through-opening 83. The retaining openings 81 in the cover 45 are preferably reinforced with a metal sleeve.

The connection device 75 for degassing shown in FIG. 9*c* preferably comprises a check valve so that gases can escape from the cover but cannot enter the cavity formed by the cover 45. This aspect is important so that, in the event of a defective battery module 1 in a configuration where a plurality of battery modules 1 are connected together, the escaping gases are not routed to the functioning, fault-free battery modules 1 and cause damage there.

Figure 10B:
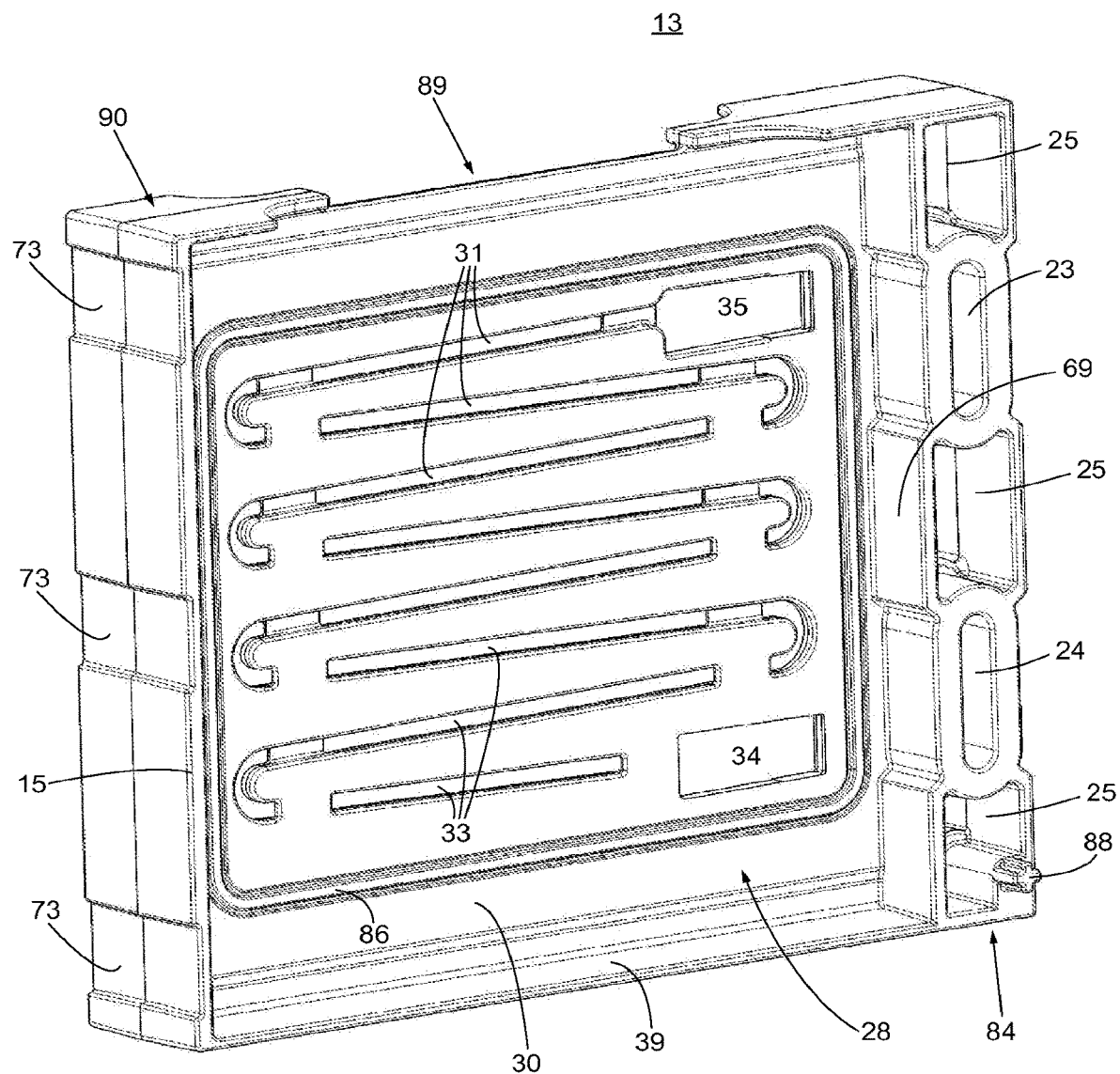

FIGS. 10*a* and 10*b* show an intermediate wall 13 from the front and back. The cooling channel 31 located in the cooling area 30 has a meander-type form. In contrast to the first embodiment, the meanders are identical; the spacing between the individual meanders is constant here. The channel 31 has a connection to the distribution channel 23 at the front end 34, while there is a connection to the collection channel 24 at the rear end 35. The coolant flows from the front end 34 preferably located in the bottom part of the intermediate wall 13 through the channel 31 to the rear end 35, which is preferably located in the upper part of the intermediate wall. The rear end 35 is in any case preferably located closer to the top side 90 of the intermediate wall 13 than the front end 34. The channel 31 is a recess 33 that is open on both sides in this preferred embodiment. It can alternatively also be open on one side.

The three through-recesses 25 through which the tension band 4 is routed are located in a distribution area 84 for the coolant in addition to the distribution channel 23 and the collection channel 24. The distribution channel 23 and the collection channel 24 each have an all-round groove 85 to accommodate a seal on the front side 20 of the intermediate wall 13. The seal ensures that the distribution channel 23 and collection channel 24 are sealed between two adjacent intermediate walls 13 so that no coolant or fluid (either in gaseous or liquid form) can escape. The distribution area 84 for an arrangement of the battery cells 5 in one row preferably corresponds to the middle part 14 for a two-row arrangement of the cells 5.

The wall of the distribution channel 23 and collection channel 24 has a plane surface on the rear side 28 (FIG. 10*b*) so that a seal located in the sealing groove 85 can produce a sealing closure with the plane top side of the wall.

A circumferential raised portion 86 in the form of a flat ridge is provided in the cooling area 30 which surrounds the channel 31. The plastic separating layer not shown here is placed on the front side 20 and the rear side 28 of the intermediate wall 13 and positioned so that the plastic separating layer 38 closes off the recess 33 that is open on both sides. It rests on the raised portion 86 and has a sealed connection with the latter, e.g. produced by welding. During welding, the raised portion 86 melts in such a way that the plastic separating layer 38 has essentially plane and direct contact on the front side 20 or rear side 28. In this way, it is ensured that the coolant (cooling fluid) is routed into the channel 31 and cannot escape from the channel 31. Before joining with the plastic separating layer 38, the raised portion 86 is preferably no more than 5 mm high, particularly preferably no more than 3 mm high and very preferably no more than 1 mm high. The raised portion 86 is practically plane after welding.

A positioning seat 87 is provided on the front side 20 of the intermediate wall 13 in the distribution area 84, being preferably located in the bottom outer corner. The positioning seat 87 is preferably a blind hole into which a corresponding positioning pin 88 projects. The positioning pin 88 is located on the rear side 28 of the intermediate wall 13 (see FIG. 10*b*).

In this second embodiment also, the intermediate walls 13 are positioned so that an intermediate wall 13 can be located between two adjacent battery cells 5. The intermediate wall side wall 15, the inner side wall of the distribution area 84, the intermediate wall base 39 and the intermediate wall top side 90 are holding elements for the battery cell 5. They jointly form a holding structure, here a frame, so that a battery cell 5 arranged at the intermediate wall 13 is at least partially framed at its sides. A recess 89 in the intermediate wall top side 90 guarantees the accessibility of the electrical connections of the battery cell 5. Two intermediate walls 13 located next to each other therefore jointly form an enclosure for a battery cell 5. The plastic of the intermediate walls 13 provides electrical insulation towards the environment in this way.

Figure 11A:
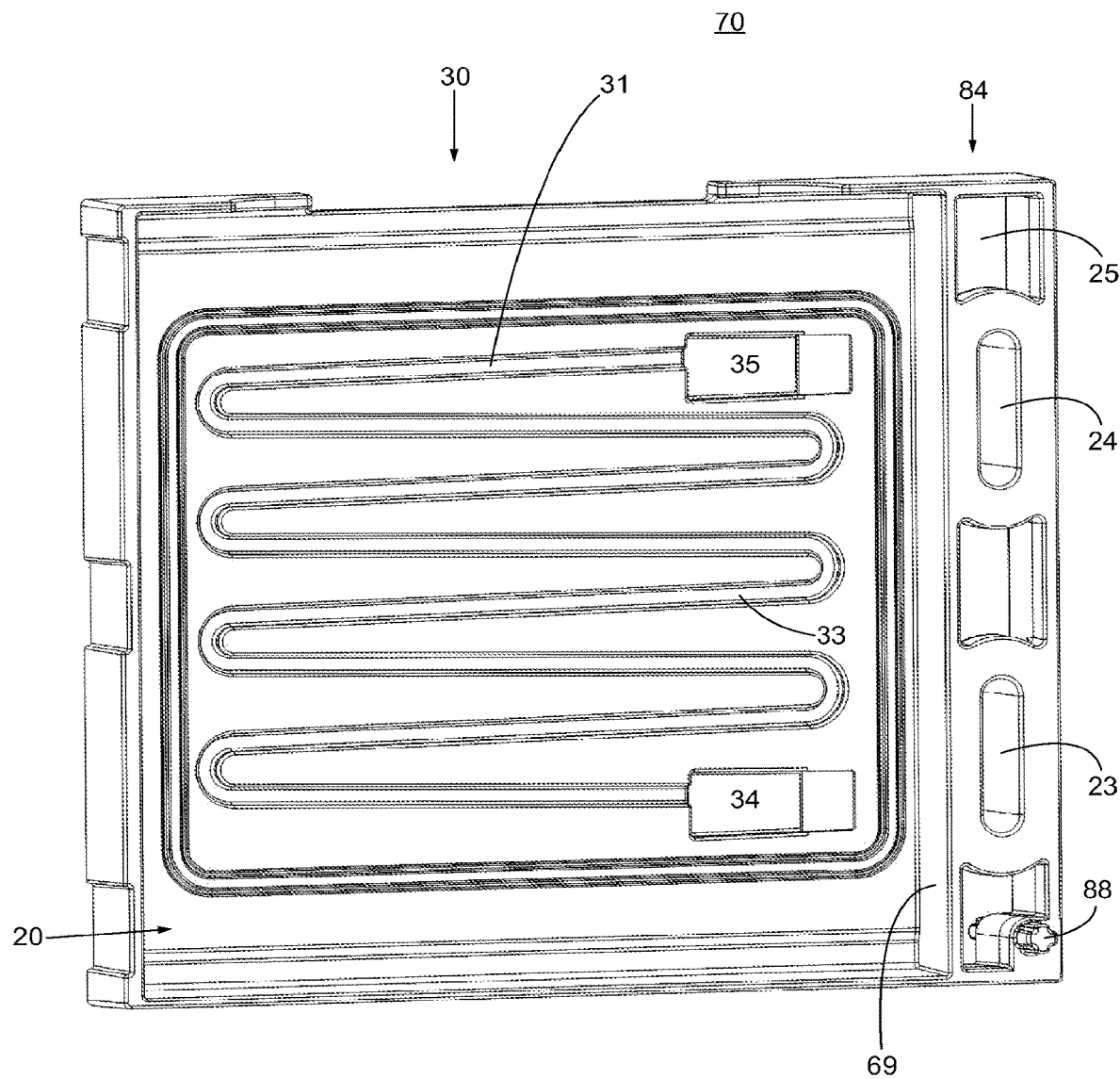
Figure 11B:
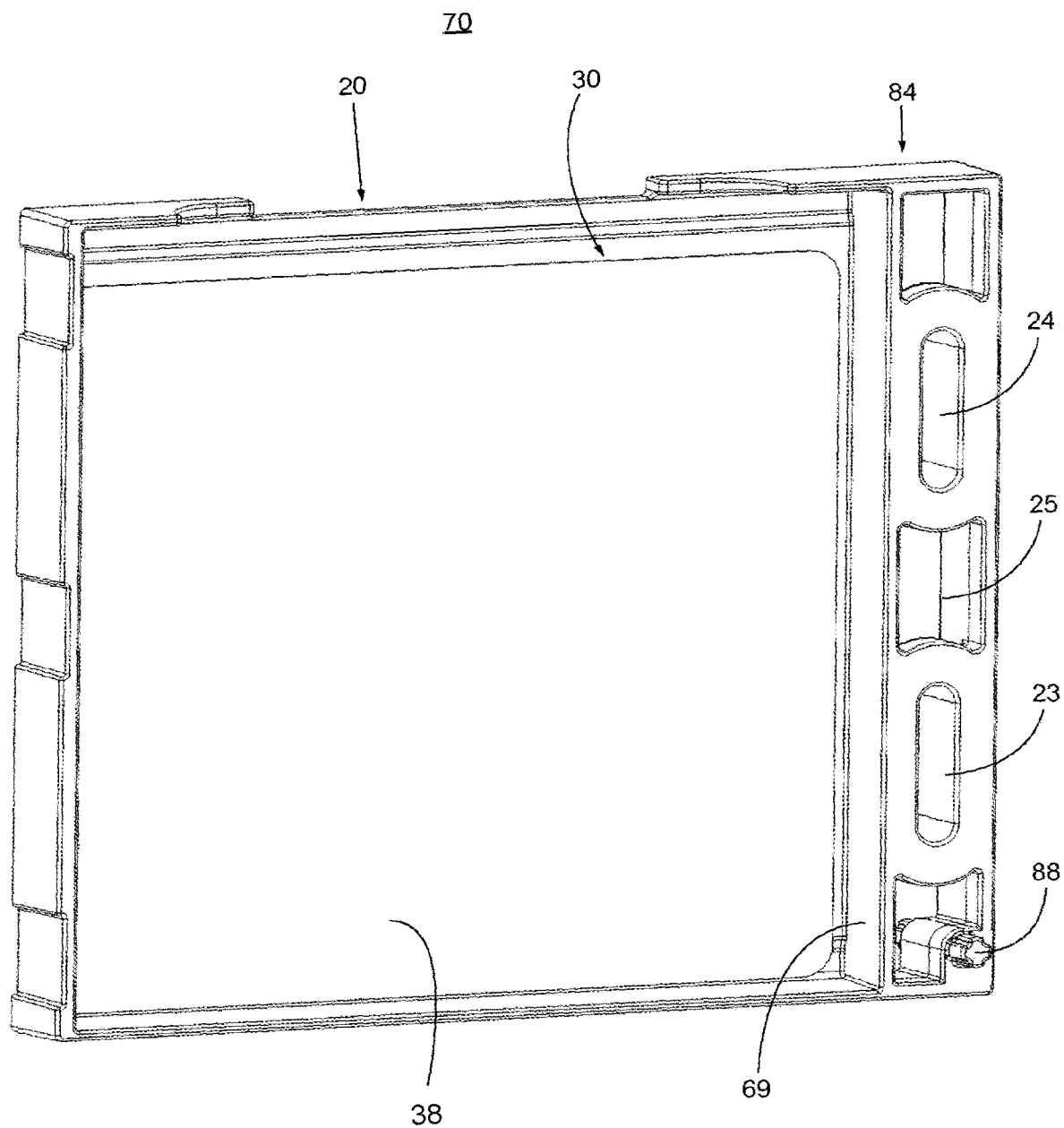
Figure 11C:
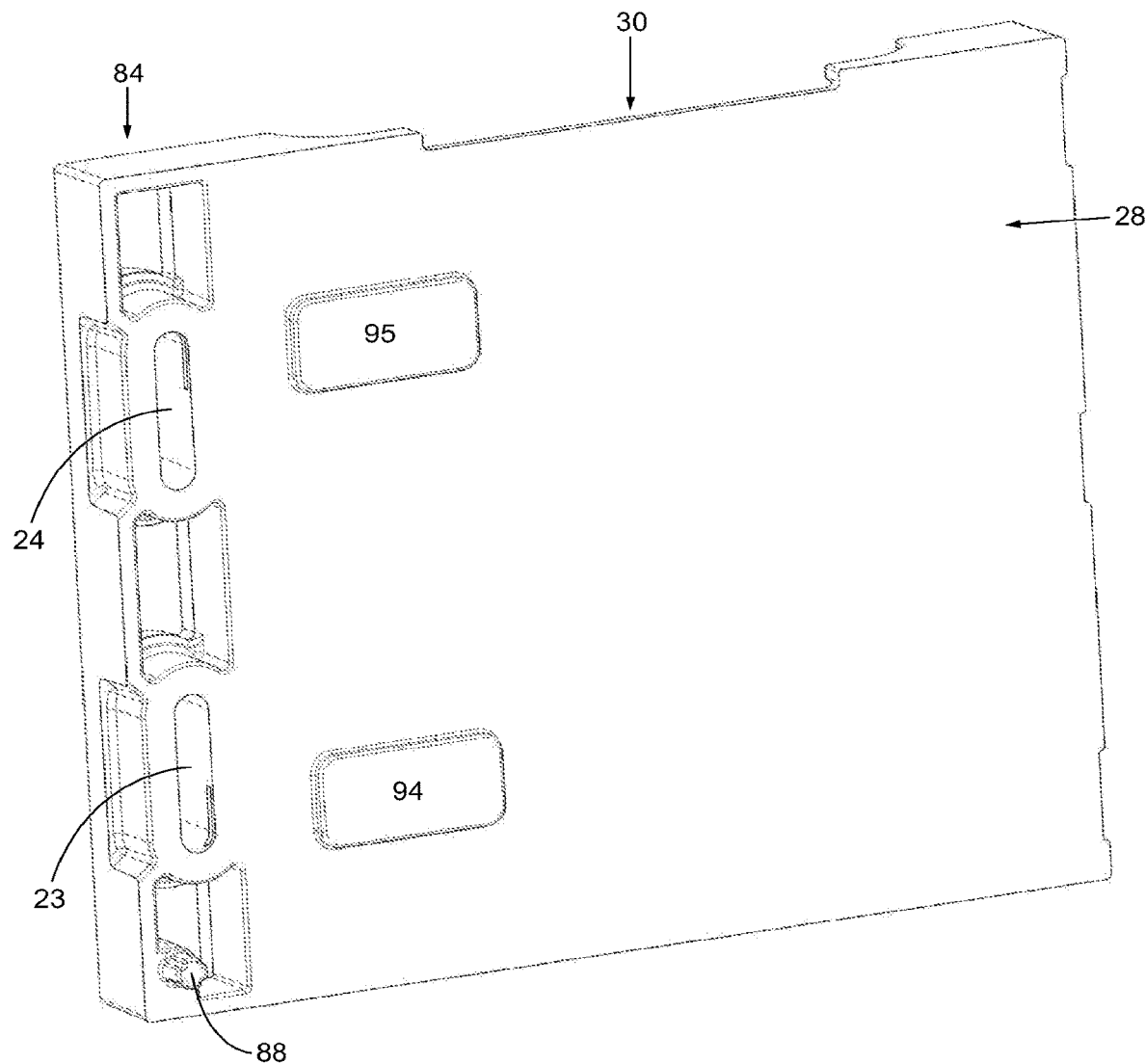
Figure 11D:
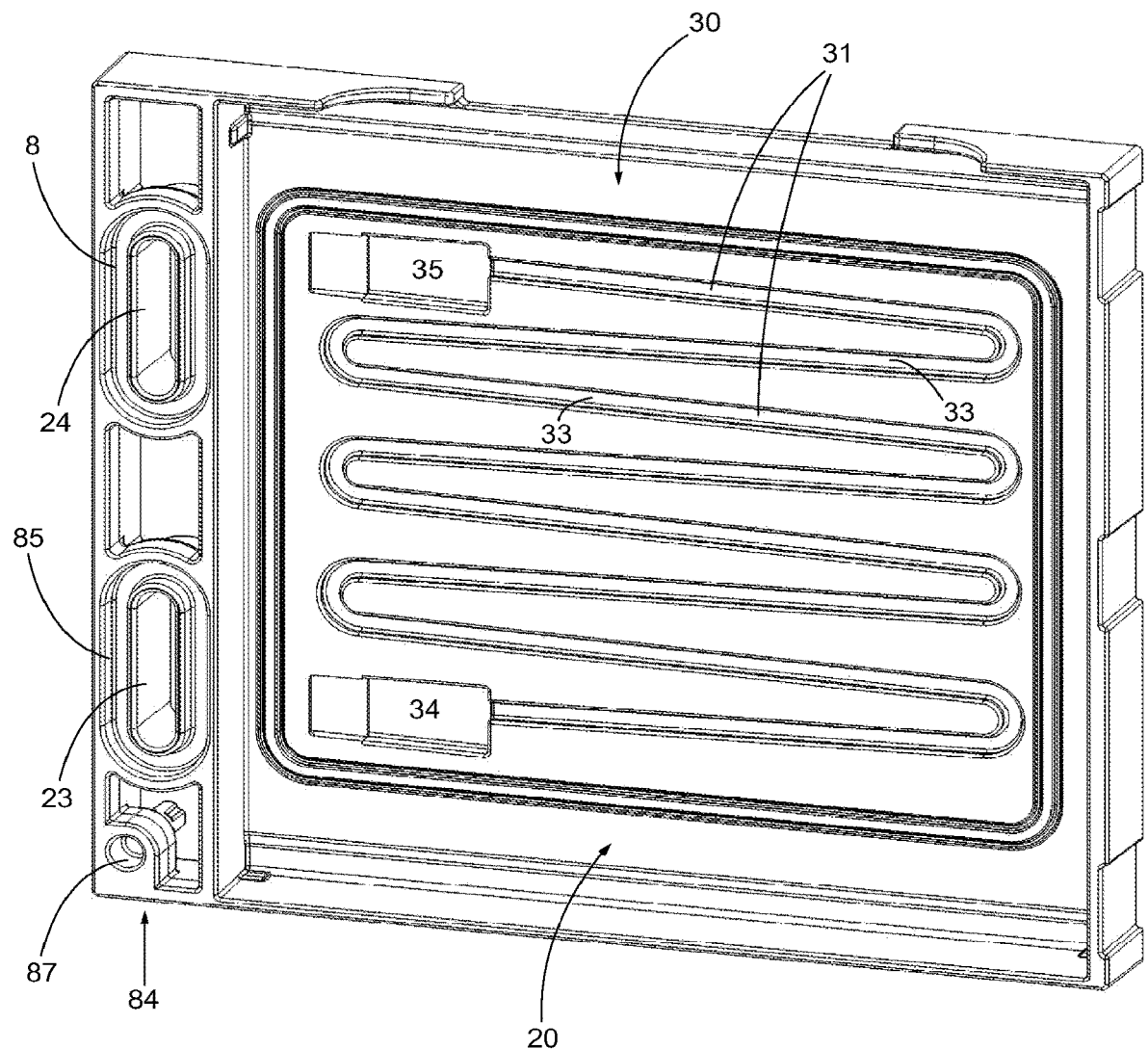

FIGS. 11*a* to 11*d* show a closing wall 70 in detail, a front closing wall 70 being shown in FIGS. 11*a* to 11*c* and a rear closing wall 70 in FIG. 11*d*.

In contrast to the intermediate wall 13, the channel 31 in the cooling area 30 is formed by a recess 33 open on one side. Since the closing wall 70 in the battery housing 2 is the outer wall through which fluid flows, it has contact with a battery cell only on one side and is used only for cooling of a battery cell 5. An outer wall 71 is adjacent on the other side of the closing wall 70 (see FIGS. 12*a*, 12*b*).

The design of the inner side (front side 20) corresponds to the design of the front side 20 of the intermediate wall 13. The channel structure 32 is also covered by a plastic separating layer 38 and seal-welded so that no fluid can escape from the channel 31. The welded closing wall 70 provided with a plastic separating layer 38 is shown in FIG. 11*b*.

The distribution channel 23 and the collection channel 24 are each designed without a sealing groove in the distribution area 84. The seal for sealing is provided in the adjacent intermediate wall. A positioning pin 88 is located in the bottom area of the distribution area 84.

FIG. 11*c* shows the rear side 28 of the front closing wall 70. In the distribution area 84, both the distribution channel 23 and collection channel 24 are also implemented without a sealing groove. The adjacent outer wall 71 has a seal in its sealing groove for sealing purposes. A positioning pin 88 is also provided in the bottom area in order to engage in the corresponding recess in the outer wall 71. No cooling channels are located in the cooling area 30 since the channels 31 are open only towards the front side 20. The rear side 28 has an essentially plane surface and features two projections or raised portions, the bottom projection 94 corresponding with the front end 34 of the channel 31 and the upper projection 95 corresponding with the rear end 35 of the channel 31. The projections serve respectively to seal the front end 34 and rear end 35 with respect to the rear side 28 of the closing wall 70.

The rear closing wall 70 shown in FIG. 11*d* differs from the front closing wall 70 only in that there is no positioning pin on the front side in the distribution area 85 and in that a positioning seat 87 is provided instead. The collection channel 24 and also the distribution channel 23 each have a sealing groove 85 on their wall. The front and rear closing walls 70 are otherwise identical. The rear closing wall 70 is also sealed in the cooling area 30 with a plastic separating layer not shown here, so that the channel 31 open on one side is closed off on the open side.

Figure 12B:
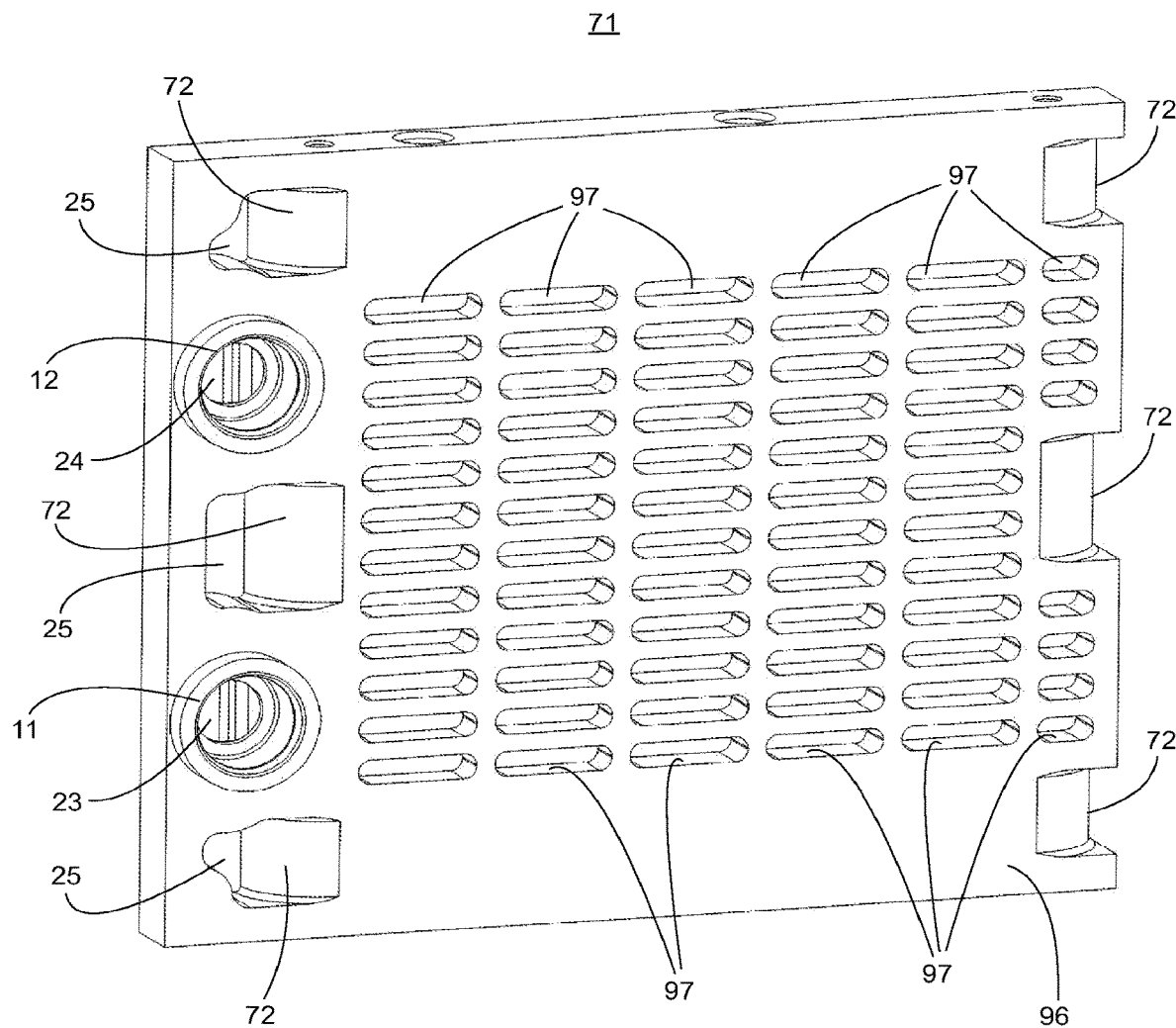

FIGS. 12*a* and 12*b* each show an outer wall from the inside and outside respectively. In contrast to the closing wall 70, there is only one embodiment of the outer wall 71, which is located both at the front end and rear end of the battery housing 2. For this reason, the outer wall 71 has a positioning seat 87 on its inner side in both corners in the distribution area 84 into which the positioning pin 88 of the closing wall 70 is inserted. The walls are each provided with a sealing groove 85 for both the distribution channel 23 as well as for the collection channel 24 so that the channels can be sealed between the closing wall 70 and the outer wall 71 in order to prevent cooling fluid from escaping.

Two recesses 92, 93 are located on the inner side 91 that correspond with the projections 94, 95 of the closing wall 70. This ensures that the closing wall 70 and outer wall 71 are in (plane) contact with each other.

FIG. 12*b* shows the outer side 96 of the outer wall 71 in detail. Both the distribution channel 23 and the collection channel 24 end in a round bushing that forms the coolant inlet 11 and the coolant outlet 12 respectively. The guide roundings 72 for guiding the tension band are visible on the outer side and on the through-recesses 25.

A plurality of longitudinal slots 97 on the outer side 96 on the one hand serve the purpose of weight reduction or are due to the manufacturing process if the outer wall 71 is made of plastic, for example. If the outer wall 71 is manufactured in its preferred embodiment from aluminum or another metal, this makes it possible to significantly reduce the weight. Increased stability is guaranteed by the use of aluminum. The outer wall 71 normally has a thickness of no more than 20 mm, preferably no more than 15 mm, further preferably no more than 12 mm, very preferably no more than 10 mm and particularly preferably no more than 8 mm. The longitudinal slots 97 have preferably a depth of at least 1 mm, preferably of at least 3 mm, further preferably of at least 5 mm, further preferably of at least 7 mm, particularly preferably of at least 9 mm. The depth of the longitudinal slots 97 is at most the same as the thickness of the outer wall 71.

The longitudinal slots 97 also serve to accommodate a mounting adapter, which allows the battery 1 to be mounted on a baseplate or other device, for example. The mounting adapter can be comb-like, for example, with teeth that engage in the longitudinal slots 97. If several batteries 1 are coupled together, this adapter element is used for mounting two coupled batteries so that they are held in position. This ensures that a connecting piece, located in the coolant inlet 11 or coolant outlet 12 and connecting two adjacent battery housings 2 with each other, remains in its sealing position and no coolant escapes.

FIGS. 13*a* to 13*d* show the first steps of the manufacturing process of a battery 1 with a battery housing 2 where the battery cells 5 are arranged in one row. The manufacturing process can be automated, e.g. fully automatic or semi-automatic with manual interventions.

Figure 13A:
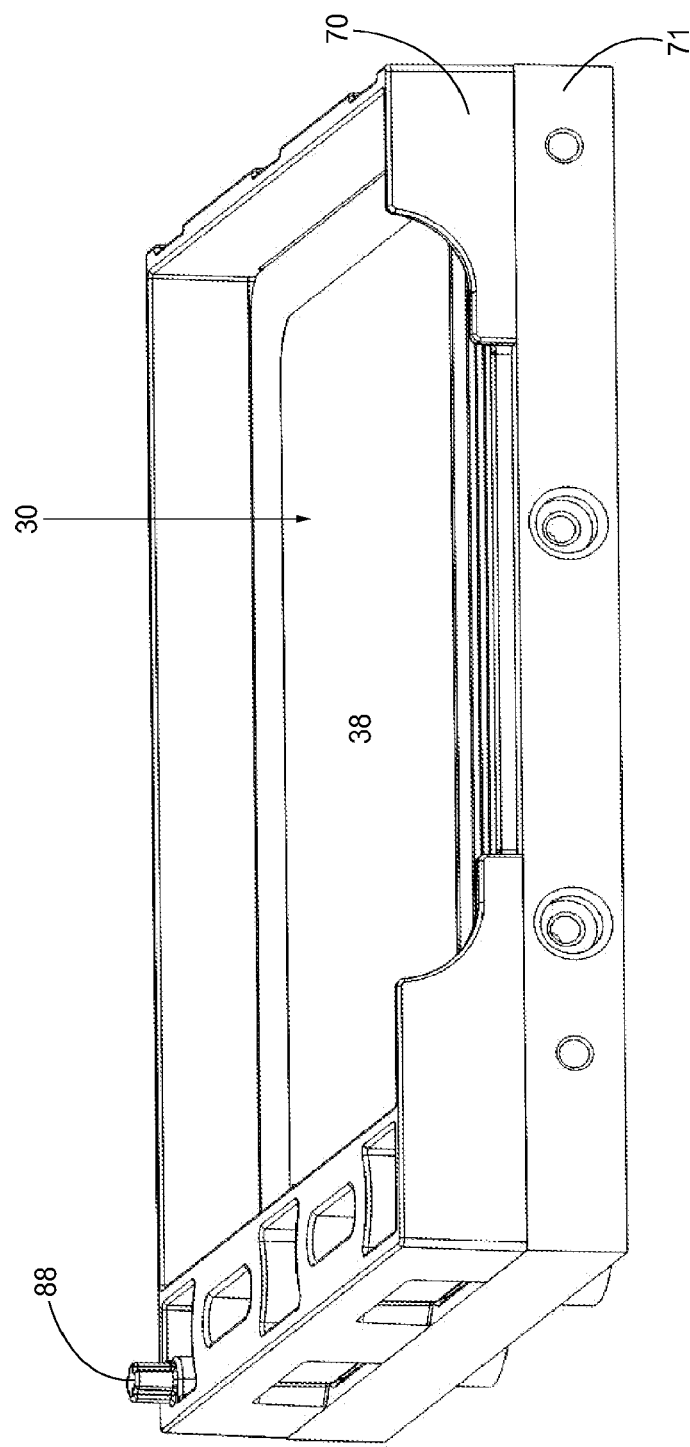

In the first step according to FIG. 13*a*, a front closing wall 70 is positioned on an outer wall 71 that is preferably positioned horizontally for the manufacturing process. The positioning pin 88 of the closing wall 70 extends into the positioning seat of the outer wall. The closing wall 70 is already provided with a plastic separating layer 38 before assembly, so that the channel is sealed in the cooling area 30.

Figure 13B:
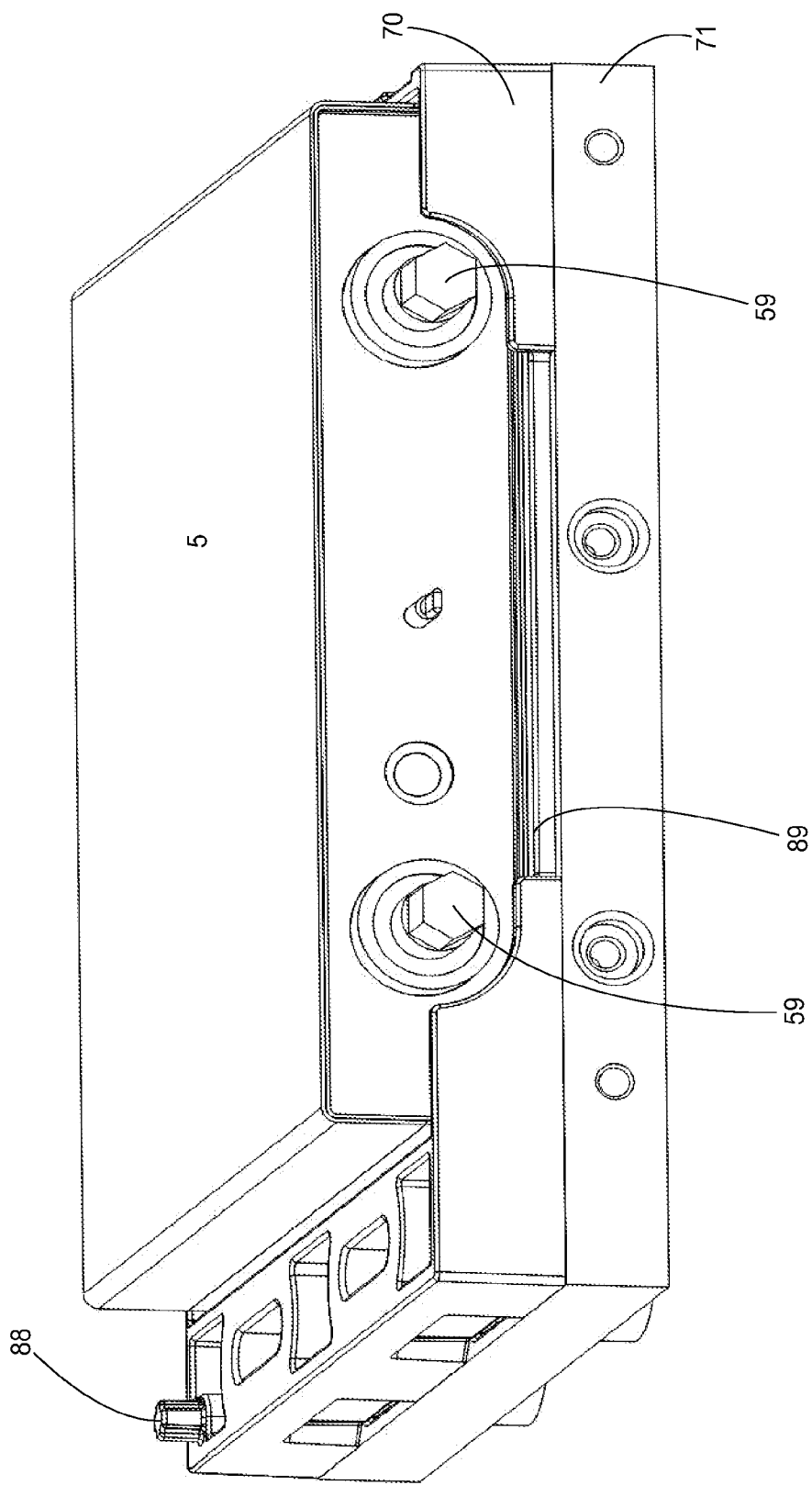
Figure 13C:
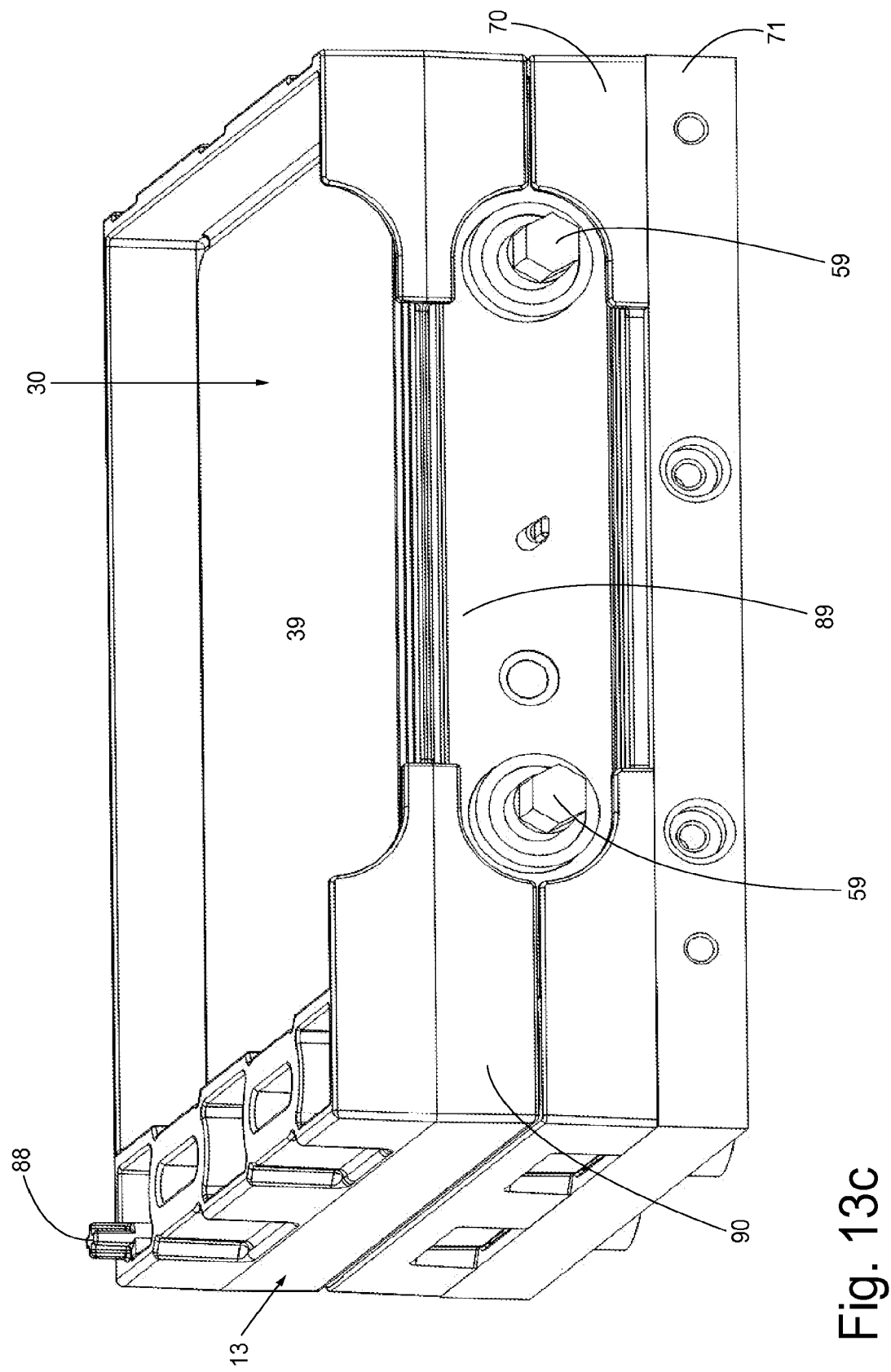
Figure 13D:
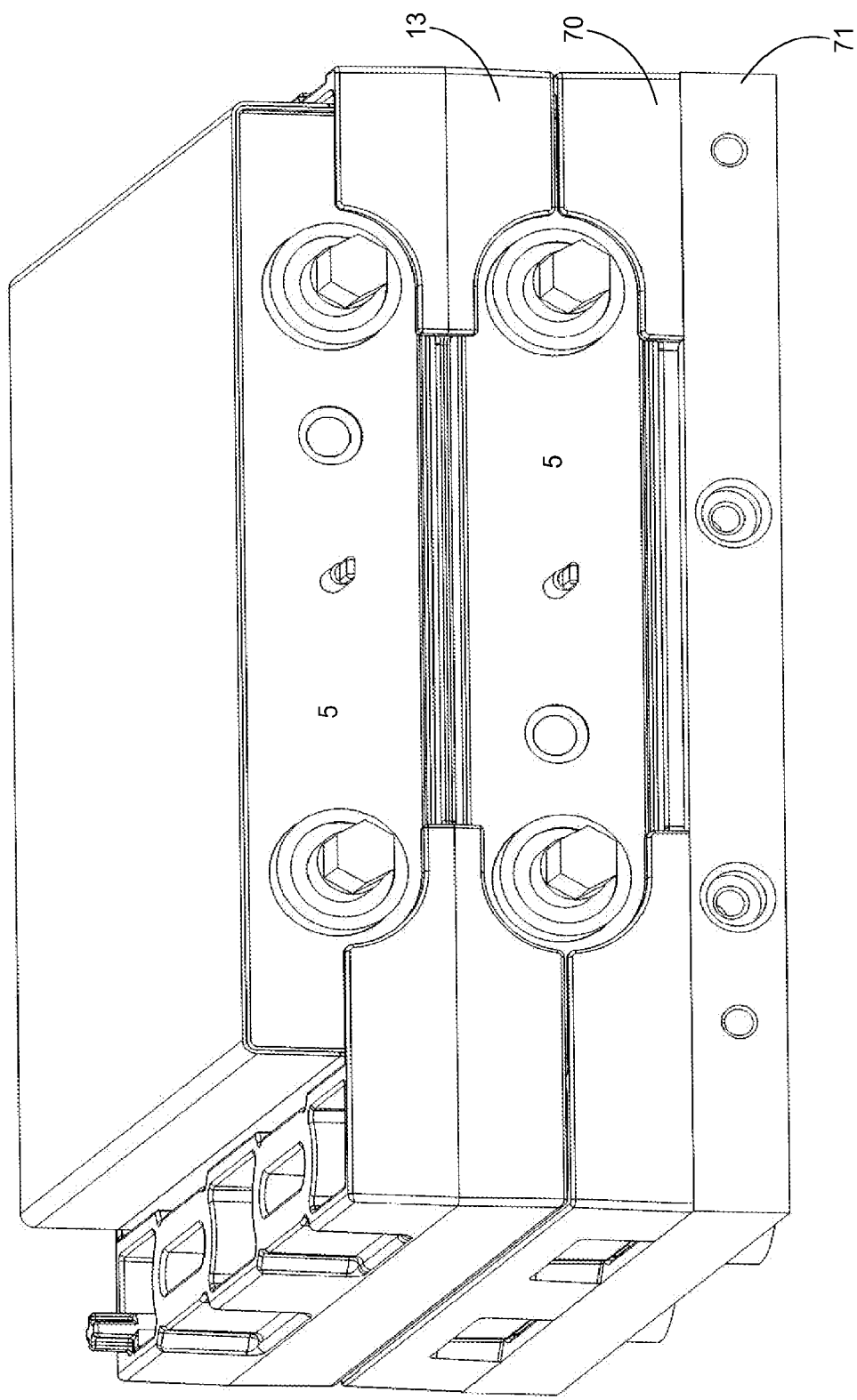

In a further step according to FIG. 13b, a battery cell 5 is positioned in the cooling area 30 of the closing wall 70 so that its electrical connections 59 are located in the area of the recess 89 in the closing wall 70. In the next step according to FIG. 13c, an intermediate wall 13 is placed on the battery cell 5 so that the positioning seat 87 engages with the positioning pin 88 of the closing wall 70. The one recess 89 of the intermediate wall top side 90 also leaves the electrical connections 59 of the battery cell 5 free. The battery cell 5 is thus enclosed by the closing wall 70 and the intermediate wall 13 except for an open area formed by the two recesses 89.

In the next step (FIG. 13d), a further battery cell 5 is now positioned on the cooling area 30 of the intermediate wall 13. This is followed alternately by further intermediate walls 30 and further battery cells until at the end of the process the last battery cell 5 is provided with a closing wall 70 and a following outer wall 71. Following this, the tension bands 4 are routed through the through-openings 25 and closed so that they encompass the battery housing 2 produced in this way. The battery cells 5 are covered with a cover foil 78 and the connection terminals 79 are assembled. The cover can be fitted after assembly of the electrical connection plates 76 and retaining elements 77.

The invention claimed is:

1. A battery module, comprising:
   a battery module housing having a cooling system with a channel structure adapted to convey a fluid coolant, wherein the channel structure is in communication with a coolant inlet and a coolant outlet formed in the battery module housing;
   a plurality of alternately positioned battery cells and plastic intermediate walls located essentially parallel to one another in the battery module housing; and
   the channel structure comprising channels disposed in each of the intermediate walls, each intermediate wall having a plastic separating layer enclosing one or more of the channels, the plastic separating layers having a thickness that is less than a thickness of the intermediate walls, each plastic separating layer directly contacting a respective outer wall of an adjacent one of the battery cells;
   wherein the channels disposed in the intermediate walls are fluidly connected to one another in a fluid-tight manner and the channel structure is adapted to convey the fluid coolant from the inlet, between the battery cells via the channels, and to the outlet.

2. The battery module according to claim 1, wherein the intermediate wall has an intermediate wall side wall that is part of a side wall of the battery module housing.

3. The battery module according to claim 2, wherein the intermediate wall side walls correspond with each other in such a manner that they engage in each other and/or lock together with each other.

4. The battery module according to claim 1, wherein the two adjacent battery cells comprise an $SO_2$-based electrolyte.

5. The battery module according to claim 1, wherein plastic parts of the battery module housing are fiber-reinforced.

6. The battery module according to claim 1, wherein the thickness of the intermediate wall is no more than 20 mm.

7. The battery module according to claim 1, wherein the recess of the channel structure in the intermediate wall has a meander-type form that extends from a lower area of the intermediate wall to an upper area of the intermediate wall.

8. The battery module according to claim 7, wherein the channel has increasingly narrow meander loops in the flow direction of the coolant.

9. The battery module according to claim 1, wherein the intermediate wall comprises a plurality of intermediate walls, and wherein the two adjacent battery cells and the plurality of intermediate walls are encompassed by a clamping device.

10. The battery module according to claim 1, wherein the coolant inlet and/or the coolant outlet comprises a quick-action coupling for simple connection without tools to an external cooling system.

11. The battery module according to claim 1, wherein the battery module housing has a cover plate located above the two adjacent battery cells and positioned transversely with respect to side walls of the battery module housing, the cover plate having a filling connection opening for filling the two adjacent battery cells with an electrolyte, said cover plate having a recess on a top side thereof that adjoins the filling connection opening.

12. The battery module according to claim 1, wherein the intermediate wall has an intermediate wall base, which projects at least partially under the two adjacent battery cells.

13. The battery module according to claim 12, wherein the intermediate wall bases correspond with each other in such a manner that they contact each other and/or lock together with each other.

14. The battery module according to claim 1, wherein:
   the battery module housing has two end walls;
   the two end walls comprise part of the channel structure; and
   one of the two end walls forms a rear wall and another of the two end walls forms a front wall of the battery module housing.

15. A method of using the battery module according to claim 1 comprising one or more of the following steps:
   providing energy to a motor vehicle;
   storing energy and feeding energy into a medium- and/or low-voltage network;
   using in decentralized energy storage in combination with installations for exploiting renewable energies;
   providing an uninterruptible power supply (UPS) or an emergency power supply; or
   stabilizing isolated networks.

16. The battery module according to claim 1, wherein the channel structure is fluid-tight and is adapted to convey fluid coolant from the coolant inlet, between the two battery cells via the channel, and to the coolant outlet.

17. The battery module according to claim 16, wherein the channel structure is adapted to convey liquid coolant.

18. The battery module according to claim 1, wherein the channels comprise channel walls, wherein the channel walls cooperate with respective ones of the plastic separating layers to close the channels.

19. The battery module according to claim 18, wherein the channel walls are continuous along a length of the channel and thereby provide a fluid barrier.

20. The battery module according to claim 1, wherein the thickness of the plastic separating layers is no more than 20% of the thickness of the intermediate walls.

* * * * *